United States Patent
Melde-Tuczai et al.

(10) Patent No.: US 11,199,130 B2
(45) Date of Patent: *Dec. 14, 2021

(54) LENGTH-ADJUSTABLE PISTON ROD WITH A CONTROL DEVICE THAT CAN BE HYDRAULICALLY ACTUATED AND A SWITCHING VALVE THAT CAN BE ELECTROMAGNETICALLY ACTUATED, A RECIPROCATING PISTON ENGINE AND A VEHICLE

(71) Applicant: AVL LIST GMBH, Graz (AT)

(72) Inventors: Helmut Melde-Tuczai, Graz (AT); Mario Theissl, Schwanberg (AT); Siegfried Loesch, Graz (AT); Florian Bodensteiner, Regensburg (DE); Anamaria Munteanu, Waldenbuch (DE); Miroslaw Robaczewski, Renningen (DE); Katrin Wand, Altdorf (DE); Abdelkarim Redouane, Graz (AT)

(73) Assignee: AVL LIST GMBH, Graz (AT)

( * ) Notice: Subject to any disclaimer, the term of this patent is extended or adjusted under 35 U.S.C. 154(b) by 12 days.

This patent is subject to a terminal disclaimer.

(21) Appl. No.: 16/306,028

(22) PCT Filed: Aug. 12, 2016

(86) PCT No.: PCT/EP2016/069313
§ 371 (c)(1),
(2) Date: Apr. 12, 2019

(87) PCT Pub. No.: WO2017/207070
PCT Pub. Date: Dec. 7, 2017

(65) Prior Publication Data
US 2019/0234300 A1 Aug. 1, 2019

(30) Foreign Application Priority Data

May 31, 2016 (AT) .............................. A 50500/2016
Aug. 10, 2016 (WO) ................. PCT/EP2016/069094

(51) Int. Cl.
*F02B 75/04* (2006.01)
*F16C 7/06* (2006.01)
(Continued)

(52) U.S. Cl.
CPC ............. *F02B 75/045* (2013.01); *F01M 1/06* (2013.01); *F02D 15/02* (2013.01); *F15B 11/10* (2013.01);
(Continued)

(58) Field of Classification Search
CPC ......... F02B 75/045; F02D 15/02; F01M 1/06; F16C 7/04; F16C 7/06
See application file for complete search history.

(56) References Cited

U.S. PATENT DOCUMENTS

| 988,344 A | 4/1911 | Holzmueller |
| 1,610,137 A | 12/1926 | Kratsch |

(Continued)

FOREIGN PATENT DOCUMENTS

| AT | 511803 | 3/2013 |
| AT | 514071 | 10/2014 |

(Continued)

OTHER PUBLICATIONS

International Search Report prepared by the European Patent Office dated Oct. 20, 2016, for International Application No. PCT/EP2016/069313.

(Continued)

*Primary Examiner* — Kevin A Lathers
(74) *Attorney, Agent, or Firm* — Sheridan Ross P.C.

(57) ABSTRACT

The invention relates to a longitudinally adjustable connecting rod (7) for a reciprocating piston engine, in particular a (Continued)

Figure 1:
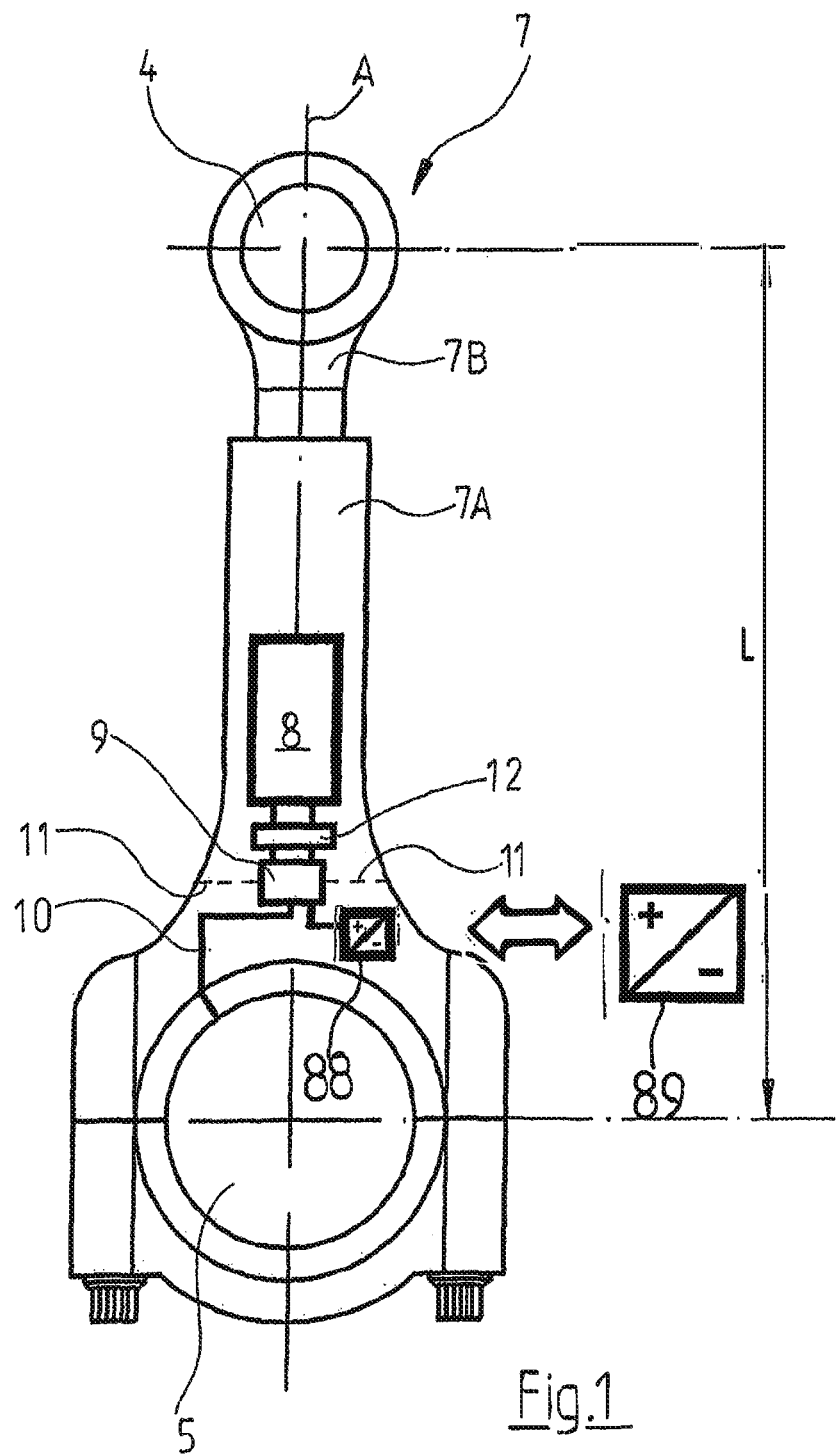

reciprocating piston internal combustion engine, a reciprocating piston engine, and a vehicle comprising a reciprocating piston engine. The longitudinally adjustable connecting rod (7) comprises a longitudinal adjusting mechanism (8) for adjusting an effective length (L) of the connecting rod, a hydraulically actuated control device (12), switchable at least between two control modes, for controlling the longitudinal adjustment, and an electromagnetically actuated hydraulic switching valve (9) for hydraulically actuating the control device (12).

26 Claims, 9 Drawing Sheets

(51) Int. Cl.
    *F16C 7/04*     (2006.01)
    *F01M 1/06*     (2006.01)
    *F02D 15/02*     (2006.01)
    *F15B 11/10*     (2006.01)
    *F15B 13/04*     (2006.01)
    *F16H 25/20*     (2006.01)

(52) U.S. Cl.
    CPC ...... *F15B 13/0402* (2013.01); *F15B 13/0406* (2013.01); *F16C 7/04* (2013.01); *F16C 7/06* (2013.01); *F16H 25/2025* (2013.01); *F01M 2001/066* (2013.01); *F15B 2211/7053* (2013.01); *F16C 2360/22* (2013.01)

(56) References Cited

U.S. PATENT DOCUMENTS

| | | | |
|---|---|---|---|
| 2,033,601 A | 3/1936 | Wohanka | |
| 2,134,995 A | 11/1938 | Anderson | |
| 2,217,721 A | 10/1940 | Anthony | |
| 2,252,153 A | 8/1941 | Anthony | |
| 2,778,378 A | 1/1957 | Presnell | |
| 2,989,954 A | 6/1961 | Hulbert | |
| 3,171,334 A | 3/1965 | Rasmussen | |
| 4,124,002 A | 11/1978 | Crise | |
| 4,140,091 A | 2/1979 | Showers, Jr. | |
| 4,195,601 A | 4/1980 | Crise | |
| 4,370,901 A | 2/1983 | Bolen | |
| 4,406,256 A | 9/1983 | Akkerman | |
| 5,178,103 A | 1/1993 | Simko | |
| 5,562,068 A | 10/1996 | Sugimoto et al. | |
| 5,724,863 A | 3/1998 | Kramer et al. | |
| 5,960,750 A | 10/1999 | Kreuter | |
| 6,394,048 B1 | 5/2002 | Styron | |
| 6,604,496 B2 | 8/2003 | Bartsch et al. | |
| 8,746,188 B2 | 6/2014 | Wilkins | |
| 9,528,546 B2 * | 12/2016 | Melde-Tuczai | F02B 75/045 |
| 9,617,911 B2 | 4/2017 | Paul | |
| 9,670,952 B2 | 6/2017 | Melde-Tuczai et al. | |
| 9,828,909 B2 | 11/2017 | Paul | |
| 9,845,738 B2 | 12/2017 | Pluta | |
| 10,294,859 B2 | 5/2019 | Melde-Tuczai et al. | |
| 10,494,995 B2 * | 12/2019 | Salzgeber | F16C 7/06 |
| 2004/0187634 A1 | 9/2004 | Meyer | |
| 2008/0115769 A1 | 5/2008 | Mason | |
| 2008/0251158 A1 | 10/2008 | Koch | |
| 2009/0107467 A1 | 4/2009 | Berger | |
| 2009/0205615 A1 | 8/2009 | Cannata | |
| 2010/0132672 A1 | 6/2010 | Lee et al. | |
| 2010/0218746 A1 | 9/2010 | Rabhi | |
| 2013/0247879 A1 | 9/2013 | Von Mayenburg | |
| 2015/0122077 A1 | 5/2015 | Melde-Tuczai et al. | |
| 2015/0152794 A1 | 6/2015 | Paul | |
| 2016/0177997 A1 | 6/2016 | Ezaki et al. | |
| 2016/0222880 A1 | 8/2016 | Velazquez | |
| 2016/0305471 A1 | 10/2016 | Wittek | |
| 2016/0333780 A1 | 11/2016 | Kamo et al. | |
| 2018/0258846 A1 | 9/2018 | Kamo et al. | |
| 2018/0266313 A1 | 9/2018 | Melde-Tuczai et al. | |
| 2018/0363546 A1 | 12/2018 | Theissl | |
| 2018/0371988 A1 | 12/2018 | Melde-Tuczai et al. | |
| 2019/0242300 A1 | 8/2019 | Pichler et al. | |

FOREIGN PATENT DOCUMENTS

| | | |
|---|---|---|
| AT | 516387 | 5/2016 |
| AT | 517100 | 11/2016 |
| AT | 517112 | 11/2016 |
| AT | 517217 | 12/2016 |
| AT | 517492 | 2/2017 |
| AT | 517619 | 3/2017 |
| AT | 517624 | 3/2017 |
| AT | 517718 | 4/2017 |
| CN | 101109321 | 1/2008 |
| CN | 102330561 | 1/2012 |
| CN | 103047409 | 4/2013 |
| CN | 103398001 | 11/2013 |
| CS | 229539 | 6/1984 |
| DE | 1205390 | 11/1965 |
| DE | 1287345 | 1/1969 |
| DE | 2161580 | 7/1973 |
| DE | 2414020 | 10/1975 |
| DE | 3149306 | 6/1983 |
| DE | 8429462 | 2/1985 |
| DE | 3507327 | 9/1986 |
| DE | 4026492 | 2/1992 |
| DE | 4133188 | 4/1992 |
| DE | 4226361 | 4/1994 |
| DE | 4315463 | 5/1994 |
| DE | 29608749 | 7/1996 |
| DE | 19612721 | 10/1996 |
| DE | 19703948 | 6/1998 |
| DE | 19835146 | 6/1999 |
| DE | 10213890 | 10/2002 |
| DE | 10201601 | 6/2003 |
| DE | 10230427 | 1/2004 |
| DE | 102005036701 | 2/2007 |
| DE | 102005055199 | 5/2007 |
| DE | 102007040699 | 3/2009 |
| DE | 102008038971 | 2/2010 |
| DE | 102010016037 | 9/2011 |
| DE | 102011104934 | 12/2012 |
| DE | 102012020999 | 1/2014 |
| DE | 102013210494 | 12/2014 |
| DE | 102013111617 | 4/2015 |
| DE | 102013113432 | 6/2015 |
| DE | 102014200162 | 7/2015 |
| DE | 102014004987 | 10/2015 |
| DE | 102015001066 | 10/2015 |
| DE | 102014220177 | 5/2016 |
| EP | 0438121 | 7/1991 |
| EP | 1065393 | 1/2001 |
| EP | 2280198 | 2/2011 |
| FR | 2857408 | 1/2005 |
| FR | 2889864 | 2/2007 |
| GB | 161580 | 7/1922 |
| GB | 898268 | 6/1962 |
| GB | 2161580 | 1/1986 |
| JP | S52-9703 | 1/1977 |
| JP | S58-165543 | 9/1983 |
| JP | S61-24804 | 2/1986 |
| JP | 2003-129817 | 5/2003 |
| JP | 2005-267420 | 9/2005 |
| JP | 2010-112286 | 5/2010 |
| JP | 2010-112448 | 5/2010 |
| NL | 7602119 | 9/1977 |
| RU | 2226626 | 4/2004 |
| SU | 1008523 | 3/1983 |
| WO | WO 96/01943 | 1/1996 |
| WO | WO 02/10568 | 2/2002 |
| WO | WO 2012/113349 | 8/2012 |
| WO | WO 2014/005984 | 1/2014 |
| WO | WO 2014/019684 | 2/2014 |
| WO | WO 2014/188060 | 11/2014 |
| WO | WO 2015/055582 | 4/2015 |
| WO | WO 2015/082722 | 6/2015 |

(56) References Cited

FOREIGN PATENT DOCUMENTS

| WO | WO 2015/172168 | 11/2015 |
|----|----------------|---------|
| WO | WO 2015/193437 | 12/2015 |
| WO | WO 2016/042605 | 3/2016 |
| WO | WO 2016/083592 | 6/2016 |
| WO | WO 2016/103554 | 6/2016 |
| WO | WO 2016/203047 | 12/2016 |
| WO | WO 2017/001229 | 1/2017 |
| WO | WO 2017/025580 | 2/2017 |

OTHER PUBLICATIONS

Official Action for Austria Patent Application No. 50713/2015, dated Jul. 6, 2016, 3 pages.
Official Action for Austria Patent Application No. 51062/2015, dated Oct. 25, 2016, 3 pages.
Official Action for Austria Patent Application No. 51062/2015, dated Jul. 14, 2017, 2 pages.
Official Action for Austria Patent Application No. 50390/2016, dated Oct. 25, 2016, 3 pages.
Official Action for Austria Patent Application No. 50390/2016, dated Feb. 2, 2018, 2 pages.
Search Report for Austria Patent Application No. GM 8003/2017, dated Jan. 27, 2017, 3 pages.
Official Action with English Translation for China Patent Application No. 201680073147.0, dated Mar. 20, 2020, 13 pages.
International Search Report for International (PCT) Patent Application No. PCT/EP2016/069092, dated Aug. 11, 2016, 2 pages.
International Search Report for International (PCT) Patent Application No. PCT/EP2016/069093, dated Nov. 8, 2016, 2 pages.
International Search Report prepared by the European Patent Office dated Oct. 20, 2016, for International Application No. PCT/EP2016/069094.
English Translation of the Written Opinion for International (PCT) Patent Application No. PCT/EP2016/069094, dated Nov. 8, 2016, 6 pages.
English Translation of the International Preliminary Report on Patentability for International (PCT) Patent Application No. PCT/EP2016/069094, dated Jun. 28, 2018, 8 pages.
International Search Report for International (PCT) Patent Application No. PCT/EP2016/069313, dated Nov. 8, 2016, 3 pages.
International Search Report prepared by the European Patent Office dated Feb. 21, 2017, for International Application No. PCT/EP2016/080940.
English Translation of the International Preliminary Report on Patentability for International (PCT) Patent Application No. PCT/EP2016/080940, dated Jun. 28, 2018, 8 pages.
Official Action with English Translation for China Patent Application No. 201680088136.X, dated Jul. 28, 2020, 15 pages.

* cited by examiner

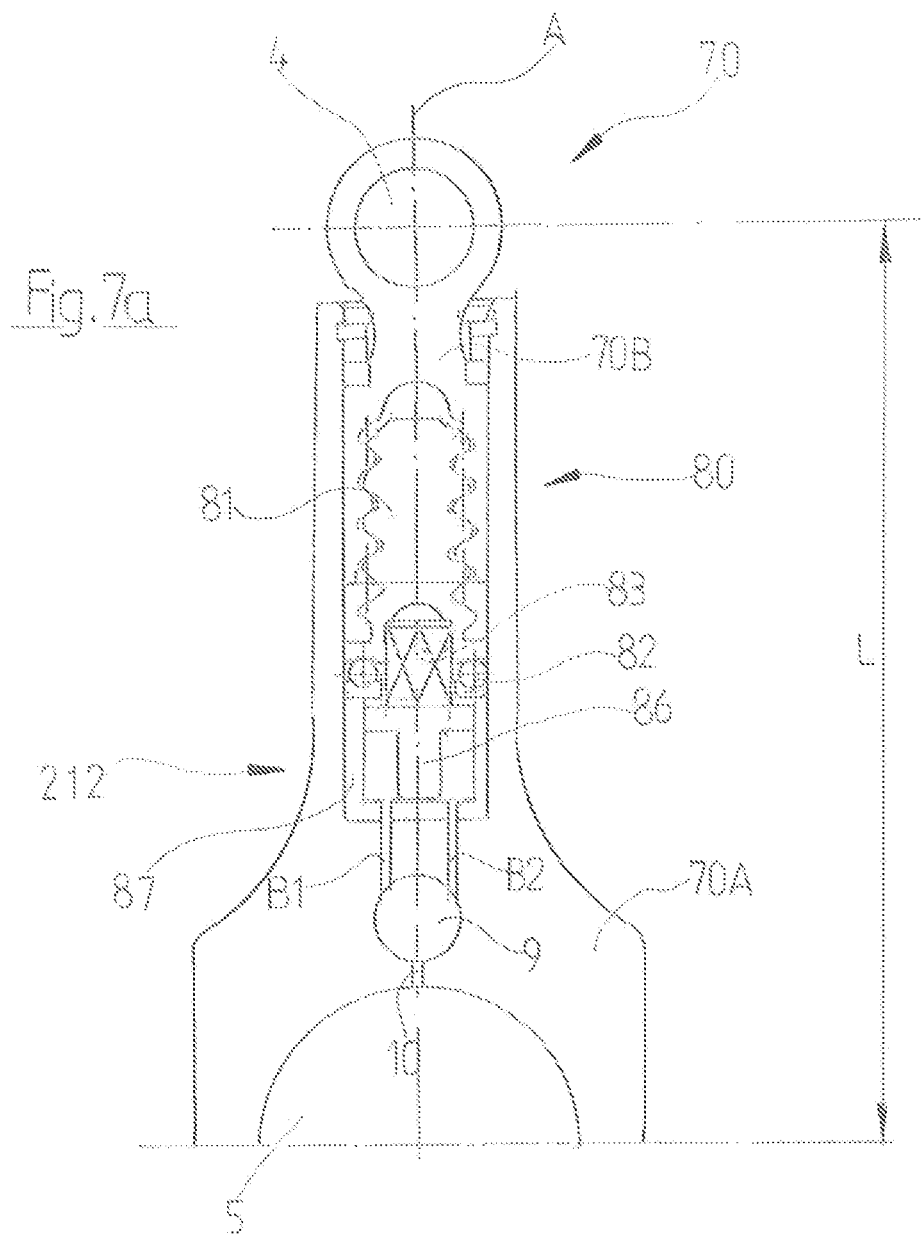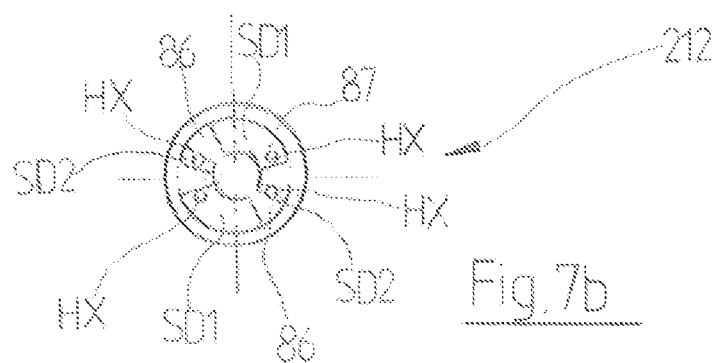

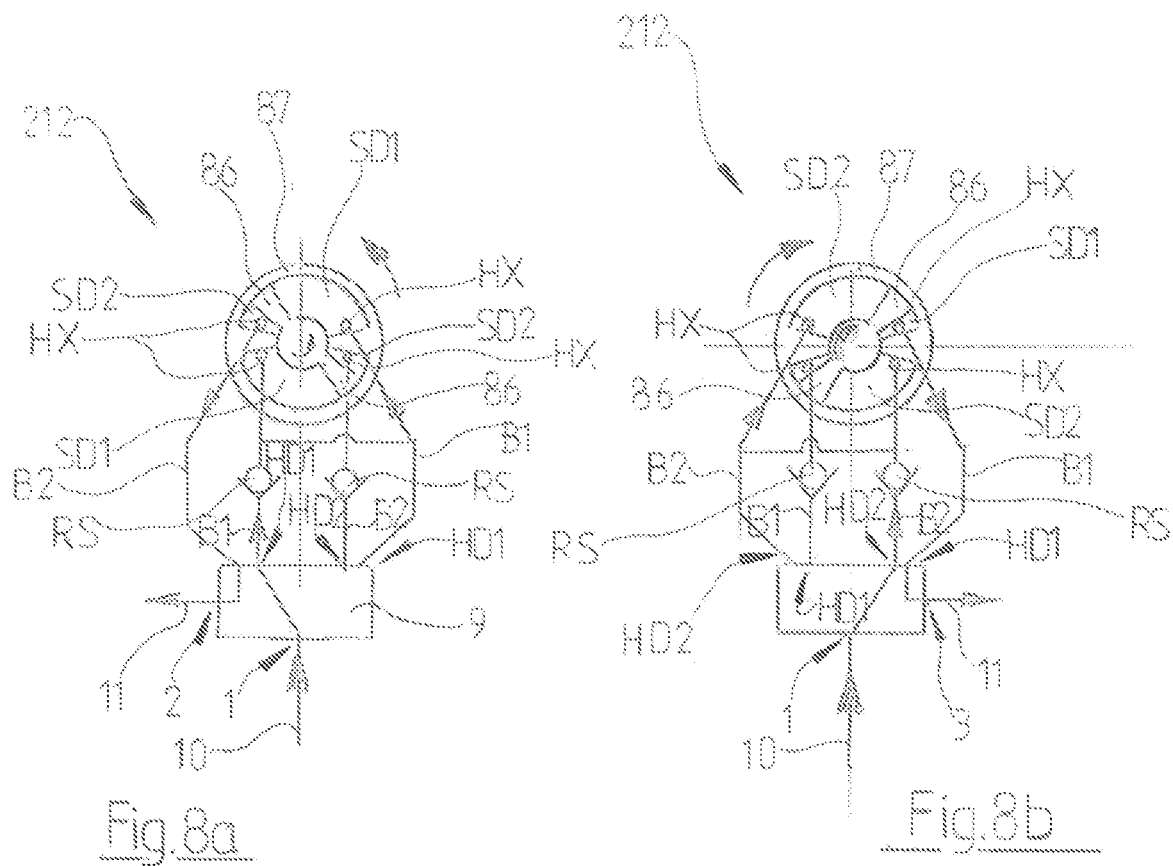

LENGTH-ADJUSTABLE PISTON ROD WITH A CONTROL DEVICE THAT CAN BE HYDRAULICALLY ACTUATED AND A SWITCHING VALVE THAT CAN BE ELECTROMAGNETICALLY ACTUATED, A RECIPROCATING PISTON ENGINE AND A VEHICLE

CROSS REFERENCE TO RELATED APPLICATIONS

This application is a national stage application under 35 U.S.C. 371 and claims the benefit of PCT Application No. PCT/EP2016/069313 having an international filing date of 12 Aug. 2016, which designated the United States, which PCT application claimed the benefit of Austria Patent Application No. A 50500/2016 filed 31 May 2016 and International Application No. PCT/EP2016/069094 filed 10 Aug. 2016, the disclosure of each of which are incorporated herein by reference.

The invention relates to a length-adjustable piston rod for a reciprocating piston engine, in particular for a reciprocating piston internal combustion engine, wherein the piston rod has a length adjustment device by means of which an effective length of the piston rod can be adjusted.

Further, the invention relates to a reciprocating piston engine with a piston rod in accordance with the invention, in particular such a reciprocating piston engine constructed as a reciprocating piston internal combustion engine, as well as a vehicle with such a reciprocating piston engine.

The term "piston rod" is usually understood to be the rod-shaped connecting element that, in a reciprocating piston engine, connects the crankshaft of the reciprocating piston engine with a piston. The piston rod serves to convert a linear movement of the actuator piston or working piston, in particular a linear oscillating axial movement of the piston, into a circular movement of the crankshaft or, conversely, to convert a circular movement of the crankshaft into a linear movement of the piston.

The term "crankshaft" in the sense of the invention is generally understood to be a shaft which is constructed to convert, in a reciprocating piston engine, a linear oscillating motion, i.e. a translatory motion, of one or more pistons into a rotary motion with the aid of piston rods or, conversely, to convert a rotary motion into a translatory motion.

For the purpose of enabling a connection with the piston and the crankshaft, the piston rod usually has a piston rod eye in the region at each of its two ends, preferably a smaller piston rod eye and a larger piston rod eye.

By means of the smaller piston rod eye, the piston can be attached to the piston rod using a piston pin. The piston rod can be connected to the crankshaft via the larger piston rod eye, whereby a piston rod bearing constructed as a slide bearing is usually arranged in the larger piston rod eye, which piston rod bearing is lubricated with a hydraulic medium, in particular with the engine oil of a reciprocating piston engine.

The piston rod is mounted around the crankshaft and the piston pin so that it can rotate about an axis of rotation, whereby the distance between the two axes of rotation defines the effective piston rod length. By changing the effective piston rod length, in particular by adjusting the effective piston rod length, the compression ratio in a reciprocating piston engine can be changed, since the change in the effective piston rod length causes a shift in the top dead center of the piston movement.

Length-adjustable piston rods are in particular used to adjust the compression ratio in reciprocating piston engines with a variable compression ratio. Changing the compression ratio by changing the effective piston rod length is in principle known from the state of the art, for example from DE 10 2012 020 999 A1, WO2015/055582 A2, PCT/EP2016/064193, as well as the Austrian patent applications A50720/2015, A50723/2015, A50724/2015, A50725/2015 and A50930/2015 and DE 10 2016 008 306, whereby the aforementioned documents show different concepts of length-adjustable piston rods.

The length-adjustable piston rod described in DE 10 2012 020 999 A1 has an eccentric arranged in the smaller piston rod eye, whereby two hydraulic cylinders are provided outside the piston rod shaft for adjusting the eccentric, which are supplied with hydraulic medium by means of the engine oil from the reciprocating piston engine. In order to control the two hydraulic cylinders and thus to adjust the length of the piston rod, a control device is provided by means of which the hydraulic medium can be applied to each of the two hydraulic cylinders in such a way that the desired change in length is achieved.

A length-adjustable piston rod with a hydraulic length adjustment device is known from WO 2015/055582 A2, wherein the piston rod is divided into a first piston rod section and a second piston rod section, wherein the two piston rod sections can be displaced along a longitudinal axis of the piston rod relative to one another, in particular telescopically into one another or out of one another, and wherein one of the two piston rod sections forms a hydraulic cylinder and the other piston rod section forms an associated hydraulic piston. For controlling the length adjustment device, a control device which can be actuated hydraulically and which has a single-acting actuating piston which is axially displaceable perpendicular to the crankshaft axis in a longitudinal center plane of the piston rod is provided as the adjustment element. In a functional state of use of the piston rod in a reciprocating piston engine, the actuating piston can be axially displaced from a first actuating position into a second actuating position with the aid of the engine oil pressure present in an associated reciprocating piston engine against a restoring force generated by means of a spring, wherein one or more hydraulic inflows or outflows of the hydraulic length adjustment device are unblocked or blocked depending on the actuating position of the actuating piston. The spring stiffness of the return spring can be used to set the engine oil pressure above which the actuating piston is to be shifted from the first actuating position to the second actuating position.

A length-adjustable piston rod which is divided into a first piston rod section and a second piston rod section and with a hydraulic length adjustment device and a control device which can be hydraulically actuated for controlling the length adjustment device is also known from PCT/EP2016/064193. The control device described in PCT/EP2016/064193 has a first valve and a second valve, each with a valve body arranged in a valve chamber, whereby the valve bodies can each be pressed against a valve seat by means of a restoring force. The first valve chamber of the first valve is connected to a first hydraulic channel for flow communication or fluid communication and a second valve chamber of the second valve is connected to a second hydraulic channel. The valve bodies of the two valves are operatively connected to one another via a connecting device which is displaceable at least between a first position and a second position and which is fixedly connected to a double-acting actuating piston, wherein in the first position of the connecting device the first valve body and in the second position of the connecting device the second valve body can respectively be lifted by the connecting device against the restoring force from the associated first or second valve seat so that the corresponding first or second valve chamber can be flow-connected to the hydraulic medium supply channel. In each case in the other position of the connecting device, the first valve body rests on the first valve seat and the second valve body rests on the second valve seat, so that the flow connection to the hydraulic medium supply chamber is blocked. In dependence upon the engine oil pressure applied, the actuating piston of the control device assumes the first actuating position or the second actuating position. This means that the effective piston rod length and thus the compression ratio is set as a function of the applied engine oil pressure of the reciprocating piston engine.

Each of A50720/2015, A50723/2015, A50724/2015, A50725/2015 and A50930/2015also each disclose length-adjustable piston rods divided into a first piston rod section and a second piston rod section. However, the length-adjustable piston rods described in A50720/2015, A50723/2015, A50724/2015, A50725/2015 and A50930/2015 each have a mechanical length adjustment device, each with a spindle drive with a spindle and a spindle nut, in particular a threaded spindle drive or a ball screw drive, whereby a relative rotation of the spindle and the spindle nut causes a length adjustment of the piston rod. In order to control the length adjustment, a control device which can be hydraulically actuated is also provided for each of these piston rods, the actuation of which is dependent on an applied engine oil pressure of the reciprocating piston engine.

A disadvantage of the length-adjustable piston rods described in the above documents, in which the hydraulic actuation of the control device is effected with the aid of the engine oil pressure present in the reciprocating engine, is in particular that the oil pressure is generally dependent on the rotational speed of the crankshaft.

To solve this problem, DE 10 2016 008 306, for example, proposes to additionally arrange a mechanical actuating device in the piston rod, which can be actuated by means of a sliding guide or such like provided in the crankcase and which is constructed for hydraulic actuation of the control device. In this way, the control device can be actuated independently of the engine oil pressure. On the one hand, the mechanical control device is only flexible to a limited extent. On the other hand, in particular the components which are required on the crankcase side require installation space, which is not always available.

Against this background, it is therefore an object of the invention to provide an alternative, length-adjustable piston rod for a reciprocating piston engine. In particular, it is an object to provide an improved length-adjustable piston rod, which preferably enables an even more flexible length adjustment and which requires hardly any additional installation space. In addition, it is an object of the invention to provide an alternative reciprocating piston engine, in particular an improved reciprocating piston engine, as well as an alternative, in particular improved vehicle with a reciprocating piston engine.

These objects are solved in accordance with the invention by the teaching of the independent patent claims. Preferred further developments of the invention are the subject of the dependent claims and will be explained in more detail below. The wording of the claims is incorporated into the description.

A length-adjustable piston rod in accordance with the invention comprises a control device for controlling the length adjustment device, which control device can be actuated hydraulically and which can be switched between at least two control states, and a hydraulic switching valve which can be actuated electromagnetically for hydraulically actuating the control device. This means that the switching valve has the function of a control valve or serves as a control valve for controlling or actuating the control device.

Due to the additional, electromagnetically actuatable switching valve, only one hydraulic medium pressure level and thus in particular only one engine oil pressure level is required in order to adjust the piston rod length in an associated reciprocating piston engine. Further, the electromagnetically actuatable hydraulic switching valve enables the control device to be actuated independently of the hydraulic medium pressure level of the reciprocating piston engine, in particular independently of an engine oil pressure level present in a reciprocating piston engine and thus almost independently of an operating condition of the reciprocating piston engine.

The combined use of a hydraulically actuatable control device together with an electromagnetically actuatable hydraulic switching valve for hydraulic actuation of the control device has, in particular in the case of hydraulic length adjustment devices, the advantage over a length-adjustable piston rod, which only has an electromagnetic switching valve or an electromagnetically actuatable control device for controlling the length adjustment, that a particularly simple construction of the electromagnetically actuatable switching valve is possible, since the switching valve no longer needs to be constructed for the hydraulic pressures occurring in the hydraulic length adjustment device, which may well be greater than 1500 bar. If the hydraulic system of a length-adjustable piston rod in accordance with the invention is constructed accordingly, only the hydraulically actuatable control device needs to be constructed for these pressures, which, however, is usually not a problem.

In order to control each of the hydraulically actuatable control devices, in particular in order to set two different effective piston rod lengths, it is preferable, in accordance with the invention, that only one hydraulic medium pressure level, i.e. only one engine oil pressure level, is required. Among other things, the control system is insensitive to possible dependencies of the oil pressure on the rotational speed of the crankshaft or other fluctuations of the oil pressure.

A change in the effective piston rod length and hence a change in the compression ratio is thus also independent of the operating condition or of certain changes in the operating condition of the reciprocating piston engine. This allows a flexible use of the advantages which result from the length adjustment.

A reciprocating piston engine in the sense of the invention is a machine by means of which a linear stroke movement of a piston can be converted into a rotary movement of a shaft or, conversely, a rotary movement of a shaft into a linear stroke movement of a piston.

In an advantageous embodiment of a piston rod of adjustable length in accordance with the invention, the piston rod has a first piston rod section and a second piston rod section, wherein the two piston rod sections are preferably movable relative to one another for adjusting the effective piston rod length, in particular along a longitudinal axis of the piston rod. The two piston rod sections are particularly preferably telescopically axially displaceable relative to one another, in particular the two piston rod sections can be telescopically pushed one into the other or pulled apart.

If the two piston rod sections are movable relative to one another along the longitudinal axis of the piston rod, in particular axially displaceable relative to one another, a change in the effective piston rod length also causes a change in the absolute piston rod length, whereby the absolute piston rod length is understood to mean the piston rod length over which the entire piston rod extends along its longitudinal axis of the piston rod, whereas the effective length of the piston rod is understood only to mean the distance between the axis of rotation in the smaller piston rod eye and the axis of rotation in the larger piston rod eye.

In a further advantageous embodiment of a piston rod of adjustable length in accordance with the invention, a length adjustment of the piston rod can be effected by changing the control state of the control device, wherein preferably an actuation of the control device can be effected by switching the switching valve from a first switching state to a second switching state.

To this end, the switching valve, which is an electromagnetically actuatable hydraulic valve, and the hydraulically actuatable control device are hydraulically operatively interconnected. The switching valve or control valve is in particular constructed to control the hydraulic flow to the control device and from the control device in such a way that the desired control state of the control device is set in dependence upon the switching state of the switching valve. The control device is also operatively connected with the length adjustment device, in particular in such a way that by actuating the control device, in particular by switching the control device from a first control state to a second control state, in particular with the aid of the switching valve or control valve, a change in the effective piston rod length can be effected.

In a further advantageous embodiment of a piston rod of adjustable length in accordance with the invention, the switching valve can be actuated inductively and preferably switched electrically, wherein the piston rod preferably has an induction device for inductively actuating the switching valve, and in particular wherein the switching valve is or can be electrically connected to the induction device. In other words, this means that an electrical current or an electrical voltage can preferably be generated with the aid of an induction device arranged in the piston rod, by means of which the switching valve can be switched, wherein preferably, when a first electrical state is present, i.e. when a first electrical voltage or a first electrical current is present, the switching valve is switched to the first switching state or assumes the first switching state, and preferably, when a second electrical state is present, i.e. when a second electrical voltage or a second electrical current is present, the switching valve is switched to the second switching state or assumes the second switching state.

The induction device in the piston rod is preferably constructed in such a way that, by means of a suitable magnet device, in particular a switchable magnet device, which is preferably arranged in the crankcase or is fixed with respect to the crankcase, in an installed state of the piston rod according to its function in a reciprocating piston engine, an electrical current can be induced in the switching valve, in particular in order to actuate the switching valve.

For detailed explanations as to how such an induction device can, for example, be constructed and arranged in a piston rod, as to how a magnet device fixed with respect to a crankcase can, for example, be constructed and as to how the induction device can be electrically coupled to the switching valve, as well as with regard to the arrangement of the switching valve and the induction device in the piston rod, reference is made to A50390/2016 and PCT/EP2016/069093 of the applicant, which describe in detail how an electromagnetic switching valve can be electrically switched and inductively actuated.

In a further advantageous embodiment of a piston rod of adjustable length in accordance with the invention, the control device has at least one hydraulically actuatable actuating element, wherein the actuating element is arranged displaceably at least between a first actuating position and a second actuating position in a hydraulic working chamber. Preferably, in a first control state of the control device, the actuating element is in the first control position and in a second control state of the control device the actuating element is in the second control position.

In a further advantageous embodiment a piston rod of adjustable length in accordance with the invention comprises a hydraulic medium supply line as well as a drainage line.

A hydraulic medium supply line in the sense of the invention in which hydraulic medium can be guided, in particular by means of an engine oil pressure present in a reciprocating piston engine.

A drainage line in the sense of the invention is understood to mean hydraulic lines and outlet openings in the piston rod, by means of which hydraulic medium can be discharged from the piston rod in such a way that a pressure reduction in the hydraulic components connected to the drainage line takes place. For example, a drainage line can be formed by a bore in the piston rod by means of which hydraulic medium can be discharged into the crankshaft chamber. However, a drainage line can also be formed, for example, by openings in the control device and/or the switching valve, whereby hydraulic medium can flow out of the openings in particular into the crankshaft chamber.

In a further advantageous embodiment of a piston rod of adjustable length in accordance with the invention, the control device has at least one slide (valve) or is constructed as a slide (valve), wherein the slide valve and/or the slide is preferably an axial slide (valve) with an axially displaceable actuating piston or a rotary slide (valve) with a rotary piston mounted rotatably about an axis.

The slide (valve) can in particular be constructed as a linear slide (valve) with an axially displaceable actuating element, in particular an axially displaceable actuating piston, or as a rotary slide (valve) with an actuating element mounted rotatably about an axis, in particular a rotary piston. Slide valves as such are known in principle, whereby for example in particular the hydraulically actuatable slides (slide valves) described in DE 10 2016 008 306, A50720/2015, A50723/2015 and A50725/2015, to which reference is hereby expressly made for more detailed information with regards to the slides (slide valves), are, based on their basic structure, suitable for a control device for controlling a piston rod of adjustable length in accordance with the invention.

In a further advantageous embodiment of a piston rod of adjustable length in accordance with the invention, the control device, in particular the slide valve, has at least one single-acting actuating element, preferably a single-acting hydraulic piston, wherein the hydraulic piston can be axially displaced, in particular in a hydraulic working chamber of the control device, and wherein preferably the hydraulic working chamber of the control device is constructed as a single-acting hydraulic cylinder.

A single-acting hydraulic cylinder with a single-acting actuating element as actuating element in the sense of the invention is actuated when hydraulic medium is introduced into the hydraulic working chamber with a hydraulic working pressure that is at least high enough so that the actuating element is displaced, in particular from a first actuating position into a second actuating position as a result of the applied working pressure in the working chamber.

By the hydraulic working chamber being drained, i.e. by the pressure in the hydraulic working chamber being reduced, the actuating element moves back to its starting position. In order to support the returning displacement of the actuating element when the hydraulic working chamber is being drained, an additional resetting device, e. g. a resetting spring, can be provided. The spring rigidity of the return spring can be used to determine the response behavior of the hydraulic actuator, in particular the pressure threshold to be overcome.

For hydraulic actuation of a hydraulically actuatable control device having a single-acting actuating element, in particular for hydraulic actuation of a slide valve having a single-acting actuating element, a length-adjustable piston rod in accordance with the invention is preferably constructed in such a way that, in a first switching state of the switching valve, the hydraulic working chamber of the control device is connected in a fluid-communicating manner to the hydraulic medium supply line and is drained in the second switching state of the switching valve, wherein the hydraulic working chamber is preferably connected in a fluid-communicating manner to the drainage line of the piston rod for this purpose.

In a further advantageous embodiment of a piston rod of adjustable length in accordance with the invention, in particular for hydraulic actuation of a control device with a single-acting actuating element, the switching valve has at least three hydraulic connections, wherein the switching valve is preferably constructed as a 3/2-way valve, in particular as a 3/3-way valve, wherein in particular a first hydraulic connection of the switching valve is connected or can be connected to the hydraulic medium supply line in a fluid-communicating manner and preferably a second hydraulic connection of the switching valve is connected or can be connected to the drainage line in a fluid-communicating manner, and wherein in particular a third hydraulic connection of the switching valve is connected or can be connected to the hydraulic working chamber of the control device in a fluid-communicating manner, in particular via a first actuating line.

Further, the switching valve is preferably constructed in such a way that, in the first switching state of the switching valve, the first hydraulic connection of the switching valve is connected to the third hydraulic connection of the switching valve in a fluid-communicating manner, so that, in the first switching state of the switching valve, a hydraulic medium, which is supplied to the switching valve via the first hydraulic connection, can be supplied via the third hydraulic connection, in particular to the hydraulic working chamber of the control device, and, in particular, a displacement of the actuating element of the control device from the first actuating position to the second actuating position can be effected.

By way of contrast, in the second switching state of the switching valve, preferably the third hydraulic connection of the switching valve is connected to the second hydraulic connection of the switching valve in a fluid-communicating manner, and thus in particular to the drainage line, whereby preferably the hydraulic medium can be discharged from the hydraulic working chamber of the control device and in particular a hydraulic working pressure present in the hydraulic working chamber of the control device can be reduced, whereby as a result of this a displacement of the actuating element of the control device from the second actuating position into the first actuating position can preferably be effected.

If the switching valve is constructed as a 3/3-way valve, preferably in a third switching state of the switching valve a hydraulic connection is interrupted both respectively between the first hydraulic connection and the second hydraulic connection to the third hydraulic connection, i.e. a hydraulic medium flow through the switching valve to and from the hydraulic working chamber of the control device is blocked. This makes it possible to "lock" the control device and thus also the length adjustment device and thus to fix or lock the current, effective piston rod length, as neither an inflow of hydraulic medium into the hydraulic working chamber of the control device nor a draining or outflow of hydraulic medium from the hydraulic working chamber of the control device is possible.

By means of a switching valve constructed as described above, the hydraulic working chamber of the control device can be supplied with hydraulic medium and/or subjected to a hydraulic working pressure in the first switching state via the hydraulic medium supply line, and drained in the second switching state of the switching valve, in particular by means of a fluid-communicating connection between the hydraulic working chamber and the drainage line.

Preferably the control device has, correspondingly, at least one hydraulic connection, which in particular is connected or can be connected in a fluid-communicating manner with the first actuating line and preferably with the hydraulic working chamber of the control device.

The control device of a piston rod of adjustable length in accordance with the invention is furthermore preferably constructed in such a way and interacts in particular with the length adjustment device in such a way or is operatively connected to the length adjustment device in such a way that in the first switching state of the switching valve the control device assumes a first control state and a first, effective piston rod length is obtained, and in the second switching state of the switching valve the control device assumes a second control state and a second, effective piston rod length is obtained.

In an alternative advantageous embodiment of a piston rod of adjustable length in accordance with the invention, the control device, in particular the slide valve, has at least one double-acting actuating element, wherein the actuating element is preferably a double-acting (linear) hydraulic piston or a double-acting rotary piston, and in particular wherein the double-acting actuating element divides the associated hydraulic working chamber of the control device into a first control pressure chamber and a second control pressure chamber.

Depending on the pressure difference between the two control pressure chambers, the actuating element is displaced into the first actuating position or into the second actuating position, i.e. depending on the applied pressure difference between the two control pressure chambers of the control device, the control device preferably assumes the first control state or the second control state.

In some cases it is advantageous if the actuating element is constructed as a double-acting linear hydraulic piston and in particular if it is axially displaceable in the hydraulic working chamber of the control device, whereby the hydraulic working chamber of the control device is preferably constructed as a double-acting (linear) hydraulic cylinder.

In some cases, however, it may also be advantageous if the actuating element is constructed as a double-acting rotary piston which is preferably mounted in the hydraulic working chamber of the control device so as to be rotatable about an axis, whereby the hydraulic working chamber of the control device is constructed in particular at least as a double-acting rotary (hydraulic) cylinder.

In a piston rod of adjustable length in accordance with the invention, in particular in the control device, it may be useful in some cases to provide several rotary slides connected in series, which are arranged and operatively connected to each other in such a way that their angles of rotation are added together. Such a control device with several rotary slides connected in series, each of which has at least one double-acting rotary piston rotatably mounted relative to a rotary cylinder, is described in more detail, for example, in A50720/2015.

If the control device of a piston rod of adjustable length in accordance with the invention has a rotary slide, i.e. a control device with at least one rotary piston as actuating element, it may be particularly useful in some cases if the axis of rotation of the rotary slide runs parallel to the longitudinal axis of the piston rod, in particular if it coincides therewith. In other cases, however, it may be advantageous if the axis of rotation of the rotary slide (valve) extends in particular perpendicular to the longitudinal axis of the piston rod.

For axially displaceable actuating elements, it is generally advantageous if they are arranged in the piston rod in such a way that their displacement axis extends perpendicularly to the longitudinal axis of the piston rod and, in particular, in a longitudinal center plane of the piston rod.

In a control device having at least one double-acting actuating element, in a first switching state of the switching valve the hydraulic medium supply line is preferably connected in a fluid-communicating manner to the first control pressure chamber of the control device and the second control pressure chamber is drained, whereby, for this purpose, the second control pressure chamber is preferably connected to the drainage line in a fluid-communicating manner. In the second switching state of the switching valve, however, the hydraulic medium supply line is preferably connected to the second control pressure chamber in a fluid-communicating manner and the first control pressure chamber is drained, whereby, for this purpose, the first control pressure chamber is preferably connected to the drainage line in a fluid-communicating manner.

For this purpose, the switching valve is preferably constructed as a changeover valve by means of which the first control pressure chamber or the second control pressure chamber can selectively be connected to the hydraulic medium supply line in a fluid-communicating manner and the respective other control pressure chamber can be drained, in particular connected to the drainage line.

To actuate the actuating element of the control device, the switching valve is preferably connected to the first control pressure chamber in a fluid-communicating manner via a first actuating line and to the second control pressure chamber via a second actuating line.

In a further advantageous embodiment of a piston rod of adjustable length in accordance with the invention, in particular for hydraulic actuation of a control device with a double-acting actuating element, the switching valve has at least four hydraulic connections, wherein the switching valve is preferably constructed as a 4/2-way valve, in particular as a 4/3-way valve. In particular, a first hydraulic connection of the switching valve is connected in a fluid-communicating manner to the hydraulic medium supply line of the piston rod or can be connected to it in a fluid-communicating manner. Preferably a second hydraulic connection of the switching valve is connected in a fluid-communicating manner to the drainage line or can be connected to it in a fluid-communicating manner. A third hydraulic connection of the switching valve is preferably connected in a fluid-communicating manner to the first control pressure chamber of the control device or can be connected to it, in particular via a first actuating line, and a fourth hydraulic connection of the switching valve is preferably connected in a fluid-communicating manner to the second control pressure chamber of the control device or can be connected to it in a fluid-communicating manner, in particular via a second actuating line.

The switching valve is preferably constructed in such a way that, in a first switching state of the switching valve, the first hydraulic connection of the switching valve is connected to the third hydraulic connection of the switching valve in a fluid-communicating manner and the second hydraulic connection of the switching valve is connected to the fourth hydraulic connection of the switching valve, so that, in particular, hydraulic medium can be supplied to the first control pressure chamber via the hydraulic medium supply line and hydraulic medium can be discharged from the second control pressure chamber, in particular into the drainage line, via the switching valve.

In a second switching state of the switching valve, preferably the first hydraulic connection of the switching valve is connected with the fourth hydraulic connection of the switching valve in a fluid-communicating manner and the second hydraulic connection of the switching valve is connected with the third hydraulic connection of the switching valve, so that in particular the second control pressure chamber can be supplied with hydraulic medium via the hydraulic medium supply line and hydraulic medium can be discharged from the first control pressure chamber via the switching valve and the drainage line, in particular into the crankshaft chamber.

If the switching valve is constructed as a 4/3-way valve and if, in a third switching state of the switching valve, preferably the first hydraulic connection and the second hydraulic connection of the switching valve are respectively disconnected from the third hydraulic connection and the fourth hydraulic connection of the switching valve, i.e. a hydraulic medium flow both to and from the control pressure chambers is blocked. This allows the currently set piston rod length to be fixed, i.e. the preferably possible third switching state of the switching valve enables in particular a locking of the control device and thus a locking of the length adjustment device and thus a fixing of the current, effective piston rod length.

The switching valve of a piston rod of adjustable length in accordance with the invention can be constructed in many different ways. However, the embodiments described in the applicant's PCT/EP2016/069094 have proved to be particularly advantageous, in particular for the hydraulic actuation of control devices with at least one double-acting actuating element. The content of PCT/EP2016/069094 is hereby also incorporated in this application by express reference. In particular, the construction of the electromagnetic switching valve as well as its arrangement and interconnection may, in accordance with the invention, be as described in PCT/EP2016/069094 mentioned above.

In some cases it may be advantageous if the control device has more than one hydraulic working chamber and more than one hydraulically actuatable actuating element, in particular more than one double-acting actuating element. Preferably, an actuating element is allocated to each hydraulic working chamber, wherein in particular each actuating element divides the associated hydraulic working chamber into a first control pressure chamber and a second control pressure chamber.

The actuating elements are preferably constructed and arranged to act in the same direction and, in particular, are mechanically positively coupled to one another to form a group of actuating elements. Preferably, in the first switching state of the switching valve, the hydraulic medium supply line is connected in a fluid-communicating manner to at least a first control pressure chamber, in particular to all of the first control pressure chambers, wherein the second control pressure chambers are drained, preferably by the second control pressure chambers being connected in a fluid-communicating manner to the drainage line.

In the second switching state of the switching valve, preferably the first control pressure chambers are connected in a fluid-communicating manner to the drainage line and at least a second control pressure chamber is connected in a fluid-communicating manner to the hydraulic medium supply line, in particular all of the second control pressure chambers are preferably connected to the hydraulic medium supply line in the second switching state of the switching valve.

In this case, the switching valve and/or the control device preferably has at least one hydraulic connection for each hydraulic working chamber, in particular for each control pressure chamber, wherein in particular each hydraulic working chamber, preferably each control pressure chamber, is connected or can be connected to the switching valve in a fluid-communicating manner via the associated hydraulic connection of the control device, at least one associated actuating line and via an associated hydraulic connection of the switching valve and can each preferably be connected in a fluid-communicating manner to the hydraulic medium supply line by means of the switching valve and/or can be drained and can each in particular be connected in a fluid-communicating manner to the drainage line for this purpose.

Preferably, the switching valve is in particular constructed in such a way that, in a first switching state of the switching valve, the hydraulic medium supply line is connected to the first actuating lines in a fluid-communicating manner and the drainage line is connected to the second actuating lines and, in the second switching state, the hydraulic medium supply line is connected to the second actuating lines in a fluid-communicating manner and the first actuating lines are connected to the drainage line.

In a further advantageous embodiment of a piston rod of adjustable length in accordance with the invention, the length adjustment device comprises a hydraulic cylinder with a first pressure chamber and a second pressure chamber, wherein the first pressure chamber and the second pressure chamber are separated from one another by means of a hydraulic piston, wherein one of the two piston rod sections is connected to the hydraulic cylinder and the other of the two piston rod sections is connected to the hydraulic piston, wherein the hydraulic medium supply line and the drainage line of the piston rod can each be connected to the first pressure chamber and/or the second pressure chamber in a fluid-communicating manner.

In principle, the length adjustment device of the piston rod can be constructed in any desired way. Preferably, however, the length adjustment device is constructed in such a way that one of the two piston rod sections is constructed as a guide body, in particular as a hydraulic cylinder, and the other piston rod section is constructed as a piston element which is displaceable in the guide body, in particular as a double-acting hydraulic piston, wherein in particular a first pressure chamber is defined between a first end face of the piston element and the guide body, and a second pressure chamber is defined between the second end face of the piston element and the guide body, wherein preferably at least a first hydraulic channel opens into the first pressure chamber and preferably at least a second hydraulic channel opens into the second pressure chamber, each of which are connected in a fluid-communicating manner to the control device. With a piston rod constructed in this way, a piston rod which is adjustable in length can be implemented in a particularly simple manner, in particular a simple hydraulic length adjustment device.

If there is a sufficient pressure difference between the first pressure chamber and the second pressure chamber, a length adjustment of the piston rod can be effected, wherein the control device is constructed to control the pressure difference between the first pressure chamber and the second pressure chamber.

In a further advantageous embodiment of a piston rod which is adjustable in length in accordance with the invention, in the first control state of the control device and/or in the first switching state of the switching valve, a return flow of hydraulic medium from the first pressure chamber is blocked and the second pressure chamber is drained, and in the second control state of the control device and/or in the second switching state of the switching valve a return flow from the second pressure chamber is blocked and the first pressure chamber is drained.

In a further advantageous embodiment of a piston rod which is adjustable in length in accordance with the invention, in a first control state of the control device and/or in the first switching state of the switching valve, the hydraulic medium supply line is connected to the first pressure chamber in a fluid-communicating manner and the second pressure chamber is connected to the drainage line in a fluid-communicating manner, and in a second control state of the control device and/or in the second switching state of the switching valve, the hydraulic medium supply line is connected to the second pressure chamber in a fluid-communicating manner and the first pressure chamber is connected to the drainage line in a fluid-communicating manner.

A length-adjustable piston rod having such a hydraulic length adjustment device with a hydraulic cylinder with a first pressure chamber and a second pressure chamber is described in detail, for example, in WO2015/055582 A1, PCT/EP2016/064193, as well as in DE 10 2016 008 306, to which reference is made for more detailed explanations as to the principle of operation of the length adjustment device and as regards a basic principle of operation of a control device suitable for controlling such a length adjustment device.

Depending on in which of the two pressure chambers the higher pressure is present, or which of the two pressure chambers is drained, the two piston rod sections of the piston rod can be pushed telescopically into one another or pulled apart due to the external forces during a stroke movement of the piston rod, provided that the length adjustment device is not locked or blocked by means of the control device, so that the effective piston rod length changes, in particular until a maximum change in the effective piston rod length is reached.

As in the case of the length adjustment devices described in WO2015/055582 A2 and PCT/EP2016/064193, preferably, in the first control state of the control device, the hydraulic medium supply line is connected to the first pressure chamber of the length adjustment device in a fluid-communicating manner via the control device and at least one oil supply line, and the second pressure chamber is connected to the drainage line in a flow-communicating or fluid-communicating manner via at least one return line and the control device. In a corresponding manner, in the second control state of the control device, on the other hand, the second pressure chamber of the length adjustment device is preferably connected to the second pressure chamber of the length adjustment device in a fluid-communicating manner via the control device and at least one oil supply line, and the first pressure chamber is connected to the drainage line via the control device and at least one return line.

This means that, in particular for adjusting a length of the piston rod, hydraulic medium is supplied to a pressure chamber of the length adjustment device via the hydraulic medium supply line, whereby the other pressure chamber is drained so that the desired change in piston rod length occurs.

The length adjustment device and control device are preferably constructed in the same way as the length adjustment devices described in WO2015/05582 and PCT/EP2016/064193, in such a way that, as a result of the external forces acting on the piston rod during an upward stroke of the piston rod, hydraulic medium is sucked, via the hydraulic medium supply line, into the respective pressure chamber of the length adjustment device, which pressure chamber is connected to the piston rod in a fluid-communicating manner, and the other pressure chamber of the length adjustment device is drained via the external forces acting on the piston rod during the downward stroke after an ignition operation, wherein the hydraulic medium is preferably discharged into the crankshaft chamber via the drainage line connected to this pressure chamber in a fluid-communicating manner.

The oil supply lines and return lines of the piston rod between the control device and respectively the first pressure chamber and the second pressure chamber of the length adjustment device can be constructed separately for each pressure chamber of the length adjustment device, as in the case of the length-adjustable piston rod described in WO 2015/055582 A1 or can each be formed by a common hydraulic channel, as in the case of the length-adjustable piston rod described in PCT/EP2016/064193.

The hydraulic medium can be supplied directly to the control device, i.e. in particular bypassing the switching valve, via the hydraulic medium supply line, and/or via or through the switching valve, wherein, for a direct supply of hydraulic medium, the control device is preferably directly connected in particular to the piston rod bearing in the larger piston rod eye of the piston rod, via a hydraulic medium supply line, in a fluid-communicating manner.

In particular in control devices with a double-acting actuating element, the hydraulic medium, with which the first pressure chamber and the second pressure chamber of the length adjustment device are supplied, is preferably not guided via the switching valve but past the switching valve.

Preferably, only the hydraulic medium component which is required for the hydraulic actuation or control of the control device, is guided via the switching valve, but in particular not the hydraulic medium component which is required to supply the two pressure chambers of the length adjustment device. This means that the electromagnetically actuatable switching valve can be constructed in a particularly simple manner, as it does not have to be constructed for the high hydraulic pressures which occur in the pressure chambers of the length adjustment device, which may well be greater than 1200 bar, in some cases even greater than 1500 bar. Only the control device must then be constructed for the hydraulic pressures present in the pressure chambers of the length adjustment device, which however is usually not a problem with hydraulically actuatable control devices.

If, in the case of a piston rod in accordance with the invention, the control device is constructed as a linear slide valve with two ball globe valves, as in the case of the length-adjustable piston rod described in DE 10 2016 008 306, it is advantageous if the control device is also arranged accordingly, as described in DE 10 2016 008 306, in order to avoid negative effects, in particular an undesired opening or closing of the globe valves, due to mass and acceleration forces occurring during the stroke movement of the piston rod.

In a piston rod of adjustable length in accordance with the invention the switching valve can either be arranged above the larger piston rod eye in the piston rod or, like the actuating device described in DE 10 2016 008 306, at the lower end of the piston rod below the larger piston rod eye and correspondingly it can be connected with the control device in a fluid-communicating manner via similarly constructed actuating lines.

However, it has been found to be advantageous to arrange the switching valve, like the control device, also above the larger piston rod eye, in particular in a recess, preferably in a cylindrical bore in the longitudinal center plane of the piston rod, preferably in a bore extending perpendicular to the crankshaft axis and/or perpendicular to the longitudinal axis of the piston rod.

In a further advantageous embodiment of a piston rod of adjustable length in accordance with the invention, wherein the control device, in particular the slide valve, has at least one double-acting actuating element, the control device has a total of at least four hydraulic connections, wherein preferably the first hydraulic connection of the control device is connected to the first control pressure chamber in a fluid-communicating manner and the second hydraulic connection of the control device is preferably connected to the second control pressure chamber. Preferably, a third hydraulic connection is connected or can be connected to the first pressure chamber of the piston rod or the length adjustment device in a fluid-communicating manner and preferably a fourth hydraulic connection of the control device is connected or can be connected to the second pressure chamber of the length adjustment device in a fluid-communicating manner.

This means that the control device can preferably be hydraulically controlled with the aid of the switching valve, in particular hydraulically actuated, via the first and the second hydraulic connection of the control device. The hydraulic medium inflow or outflow to the first pressure chamber of the length adjustment device can preferably be controlled via the third hydraulic connection, and the hydraulic medium inflow or outflow to the second pressure chamber of the length adjustment device can in particular be controlled via the fourth hydraulic connection.

In order to hydraulically control the control device or in order to hydraulically actuate the control device, preferably the first hydraulic connection and the second hydraulic connection of the control device are each connected to the switching valve in a fluid-communicating manner via an associated actuating line, wherein preferably the first hydraulic connection and the second hydraulic connection of the hydraulic medium supply line and/or the drainage line can be connected.

In a further advantageous embodiment of a piston rod of adjustable length in accordance with the invention, the control device, in particular the slide valve, has a total of at least six hydraulic connections, wherein a fifth hydraulic connection of the control device and preferably a sixth hydraulic connection of the control device are connected to the hydraulic medium supply line, in particular each in a fluid-communicating manner. This means that the hydraulic medium required for the length adjustment can be supplied directly to the control device and does not have to be guided via the switching valve or through the switching valve. In particular, as a result, the pressure chambers of the length adjustment device can be filled and drained more quickly, and thus the effective piston rod length can be adjusted more quickly, assuming the piston rod is constructed in a suitable manner.

In a further advantageous embodiment of a piston rod of adjustable length in accordance with the invention, the control device comprises an axial slide valve with a first valve and a second valve, each with a valve body arranged in a valve chamber, wherein the valve bodies can each be pressed against a valve seat by means of a restoring force, wherein a first valve chamber of the first valve is flow-connected to a first hydraulic channel and a second valve chamber of the second valve is flow-connected to a second hydraulic channel, and the valve bodies are operatively connected to one another via a connecting device which is displaceable at least between a first position and a second position, and wherein in the first position of the connecting device the first valve body and in the second position of the connecting device the second valve body can be lifted respectively from the associated first valve seat and second valve seat by means of the connecting device against the restoring force, and the corresponding first or second valve chamber can be connected to the hydraulic medium supply line in a fluid-communicating manner and, in the other position of the connecting device, the first valve body and the second valve body rest respectively on the first valve seat and on the second valve seat and block the flow connection to the hydraulic medium supply line.

This means that in a further advantageous embodiment of a piston rod of adjustable length in accordance with the invention, the control device is constructed as described in PCT/EP2016/064193, but preferably with the difference that the axially displaceable, double-acting actuating piston of the control device can be axially displaced from a first actuating position to a second actuating position with the aid of the hydraulic medium supplied via the switching valve to one of the two control pressure chambers and the corresponding draining of the other control pressure chamber, in particular, irrespective of the engine oil pressure applied, which is particularly advantageous.

To this end, in a piston rod of adjustable length in accordance with the invention, the control device preferably either does not have a return spring or the spring stiffness of the return spring is selected in particular in such a way that an actuation of the control device with the aid of the switching valve is possible even for the lowest possible engine oil pressure present during the operation of the reciprocating piston engine. This means that, in this respect, the control device is preferably constructed in the same way as the control device described in DE 10 2016 008 306.

The first hydraulic channel and/or the second hydraulic channel preferably serve both as an oil supply line and as a return line, depending on the control state of the control device, wherein, preferably, the first hydraulic channel is connected or can be connected in a fluid-communicating manner with the first pressure chamber of the length adjustment device, and the second hydraulic channel preferably with the second pressure chamber of the length adjustment device.

The connecting device preferably has a connecting element which can be displaced at least between a first position and a second position, in particular a connecting rod, wherein the first valve body and the second valve body are operatively connected to one another via the connecting element, and wherein the connecting element is preferably fixedly connected to a double-acting actuating piston which is axially displaceable in the hydraulic working chamber and which divides the hydraulic working chamber of the control device into a first control pressure chamber and a second control pressure chamber, in particular in such a way that it follows an axial displacement of the actuating piston.

Preferably the valve bodies and the connecting device are separate components, in particular the valve bodies and the connecting element, wherein, in the first position, the connecting device, in particular the connecting element, is spaced from the second valve body and in the second position from the first valve body, respectively.

In an alternative advantageous embodiment of a piston rod of adjustable length in accordance with the invention, the control device, in particular the slide valve, has a single-acting actuating piston which is axially displaceable in a hydraulic working chamber, wherein the control device has a total of at least six hydraulic connections. Three of the hydraulic connections of the control device preferably form a valve inlet each, and three of the hydraulic connections preferably form a valve outlet each.

Preferably, a first valve outlet of the control device is connected or can be connected in a fluid-communicating manner to the first pressure chamber of the length adjustment device, in particular via at least one oil supply line, a second valve outlet of the control device is preferably connected in a fluid-communicating manner to the second pressure chamber of the length adjustment device or can be connected thereto, in particular via at least one oil supply line, and a third valve outlet of the control device is preferably connected to the drainage line in a fluid-communicating manner or can be connected thereto.

A first valve inlet of the control device is further preferably connected in a fluid-communicating manner to the first pressure chamber of the length adjustment device or can be connected thereto, in particular via at least one return line, a second valve inlet of the control device is preferably connected to the second pressure chamber of the length adjustment device or can be connected thereto in a fluid-communicating manner, in particular via at least one return line, and a third valve inlet of the control device is preferably connected in a fluid-communicating manner to the hydraulic medium supply line or can be connected thereto.

Thus a flexible length adjustment with a hydraulic length adjustment device which is almost independent of the operating condition of a reciprocating piston engine, in particular the oil pressure, can also be implemented in a simple manner with a control device with a single-acting actuating element, wherein, in a first control state of the control device, the hydraulic medium supply line is also connected in a fluid-communicating manner to the first pressure chamber of the length adjustment device with this control device, while the second pressure chamber is drained and, conversely, in the second switching state, the first pressure chamber is correspondingly drained and the second pressure chamber of the length adjustment device is connected to the hydraulic medium supply line in a fluid-communicating manner.

Such a control device is described in detail in WO2015/055582 A1. Through the use of an electromagnetically actuatable hydraulic switching valve for hydraulic actuation of the control device in accordance with the invention, the return spring may also be omitted here, or the return spring should preferably be constructed in such a way, in particular its spring stiffness should be chosen to be so low that an actuation of the control device is possible even with a low oil pressure in the reciprocating piston engine, in particular also with the lowest possible oil pressure.

In a further advantageous embodiment of a piston rod in accordance with the invention, the third valve inlet of the control device is further connected or can be connected in a fluid-communicating manner to the hydraulic working chamber of the control device, wherein the third valve inlet of the control device is preferably connected or can be connected in a fluid-communicating manner to the hydraulic medium supply line via the switching valve, in particular via the first actuating line.

In a further advantageous embodiment of a piston rod of adjustable length, the hydraulic medium supply line is connected or can be connected to the first pressure chamber and/or to the second pressure chamber of the length adjustment device in a fluid-communicating manner by means of a bypass line, preferably additionally bypassing the control device. This means that when the piston rod length is changed, the respective pressure chamber of the length adjustment device to be filled can be filled more quickly, which enables the desired effective piston rod length to be achieved more quickly.

In a further advantageous embodiment of a piston rod of adjustable length in accordance with the invention, the hydraulic medium supply line is connected or can be connected to the first pressure chamber and/or the second pressure chamber of the length adjustment device via a respective non-return valve in a fluid-communicating manner. Preferably, at least one non-return valve is provided, in particular at least in each bypass line and/or oil supply line. The lines or line sections used as return lines preferably do not have a non-return valve. Otherwise draining is not possible.

This means that it is possible to ensure an adequate supply or a rapid filling of the pressure chambers of the length adjustment device with hydraulic medium and at the same time to block a return flow from the respective pressure chamber in a simple manner. This is usually necessary because in most cases the change in length of the piston rod per working stroke caused by the external forces is not sufficient to completely fill the respective pressure chamber or to completely empty the other pressure chamber, i.e. in particular, suction over several working strokes is necessary. In order to allow the suction of hydraulic medium but still to block a return flow from the pressure chamber, non-return valves are preferably provided, as they allow the suction of hydraulic medium in a simple way and at the same time prevent a return flow of hydraulic medium from the respective pressure chamber.

It is also possible to arrange the check valve within the control device, as is the case with the control device described in PCT/EP2016/064193, for example.

In an alternative, but also advantageous embodiment of a piston rod of adjustable length in accordance with the invention, the length adjustment device has a spindle drive with a spindle nut and a spindle, preferably a threaded spindle drive and/or a ball screw drive, wherein one of the two piston rod sections is mechanically coupled to the spindle nut and the other piston rod section is coupled to the spindle, wherein a relative rotation between the spindle and the spindle nut causes a change in the effective piston rod length.

In a further advantageous embodiment of a piston rod of adjustable length in accordance with the invention, the length adjustment device has a self-locking spindle drive with a threaded spindle and a threaded spindle nut, preferably wherein the hydraulically actuatable control device is constructed as an actuator device or forms part of an actuator device, and preferably wherein a relative rotation between the threaded spindle and the threaded spindle nut can be effected by the control device by actuating the control device by means of the switching valve, i.e. in this case the relative movement of the spindle drive can preferably be brought about or effected actively by the control device and is not brought about by external forces acting on the piston rod during a working stroke as is the case with the hydraulic length adjustment devices described above.

A50720/2015, A50723/2015 and A50724/2015 describe in detail how a piston rod of adjustable length having a length adjustment device with a threaded spindle drive with a self-locking threaded spindle and a hydraulically actuatable control device as an actuator device or as part of an actuator device can be constructed in an advantageous manner.

In A50724/2015, a piston rod of adjustable length with a threaded spindle drive with a first spindle and a first spindle nut and a hydraulically actuatable control device with a single-acting linear piston is used, which can be displaced axially along the longitudinal axis of the piston rod in a hydraulic working chamber. The hydraulic working chamber faces towards the larger piston rod eye and an end of the actuating piston facing away from the hydraulic working chamber is constructed as a non-self-locking second spindle of a second spindle drive and engages with a second spindle nut, wherein the second spindle nut is connected to the first spindle nut in a rotationally fixed manner so that an axial displacement of the linear piston of the control device causes a rotation of the second spindle nut and thus also a rotation of the first spindle nut. The rotation of the first spindle nut in turn causes a rotation of the first spindle and hence causes the two piston rod sections to slide apart or into each other and, as a result, a change in the effective length of the piston rod.

With the piston rod described in A50724/2015, the linear piston of the control device can be displaced axially along the longitudinal axis of the piston rod against the restoring force of a return spring in dependence upon the hydraulic medium pressure applied, wherein the linear piston is moved upwards, i.e. towards the smaller piston rod eye, and a first piston rod length results when the oil pressure applied is sufficient to overcome the restoring force of the return spring. If the applied oil pressure is not sufficient, the restoring force of the return spring pushes the piston downwards, resulting in a second piston rod length.

This length adjustment mechanism can also be used advantageously with a piston rod that is adjustable in length in accordance with the invention. However, in the case of a piston rod of adjustable length in accordance with the invention, the control device may be actuated, which is particularly advantageous, by means of the electromagnetically actuatable hydraulic switching valve which is provided, in accordance with the invention, for an adjustable piston rod in accordance with the invention, instead of by means of two different oil pressure levels.

For this purpose, the hydraulic working chamber of the control device is preferably connected in a fluid-communicating manner to the hydraulic medium supply line or the drainage line via the switching valve. In addition, the return spring is preferably omitted, or the return spring has a spring stiffness which is chosen so low that, with the aid of the switching valve, a hydraulic actuation of the linear piston, in particular an axial displacement of the linear piston from a first setting position to a second setting position, is possible in a large number of operating conditions of a reciprocating piston engine, preferably in all operating conditions of the reciprocating piston engine, by switching the switching valve from a first switching state into a second switching state, wherein in the first switching state the hydraulic working chamber is preferably connected to the hydraulic medium supply line in a fluid-communicating manner and is preferably drained in the second switching state.

In a corresponding manner, the length adjustment mechanisms described in A50720/2015 and A50723/2015 can also be used in a piston rod in accordance with the invention, wherein the electromagnetically actuatable switching valve provided in accordance with the invention for the hydraulic actuation of the control device, is preferably arranged in the hydraulic flow between the piston rod bearing and the control device, in particular between the discharge opening for the hydraulic medium from the larger piston rod bearing and the hydraulic working chamber or the control pressure chambers of the control device so that an adjustment of the piston rod length is possible almost independently of the hydraulic medium pressure applied.

In the advantageous embodiments of piston rods of adjustable length in accordance with the invention with a self-locking threaded spindle drive, as described above, the length adjustment preferably takes place in a phase of the stroke movement of the piston rod which is almost free of axial forces, since the self-locking threaded spindle drive under load causes the set piston rod length to be locked or fixed and otherwise excessive actuator forces are required to adjust the piston rod length. If the control device is not actuated in the load-free state, there is also no movement of the actuating element, i.e. no active adjustment of the piston rod length, so that the current piston rod length remains as set.

In an alternative advantageous embodiment of a piston rod of adjustable length in accordance with the invention and having a threaded spindle drive and/or a ball screw drive, the spindle drive is constructed as a non-self-locking threaded spindle drive, wherein the control device is constructed as a hydraulically actuatable locking device or is part of a locking device, wherein locking, releasing of the locking and/or changing of the length of the piston rod can preferably be effected by actuating the control device.

A piston rod of adjustable length having a length adjustment device with a non-self-locking threaded spindle drive is described in detail in A50725/2015 and A50930/2015, wherein in these piston rods a relative rotation of the spindle and the spindle nut of the threaded spindle drive can be blocked at least with the aid of the hydraulically actuatable control device and, as a result, the set piston rod length is fixed or the length adjustment device is locked.

In the case of the length adjustment devices mentioned above with non-self-locking threaded spindles, the adjustment of the piston rod length can be effected with the aid of the external forces acting on the piston rod during a stroke movement of the piston rod, whereby, as a rule, the external forces cause the two piston rod sections to pull apart during an upward stroke and to compress or push into one another during a downward stroke. In order to control the length adjustment, the corresponding direction of rotation of the spindle drive can be blocked or unblocked, at least with the aid of the control device, depending on the desired length change, i.e. depending on whether an increase or a decrease in the effective length of the piston rod is desired.

For this purpose, the length-adjustable piston rod described in A50725/2015 has two freewheel units arranged axially offset one behind the other along the longitudinal axis of the piston rod, each freewheel unit being connected to the spindle nut of the threaded spindle drive in a rotationally fixed manner, wherein the first freewheel unit permits a rotation of the spindle nut in a first direction and blocks a rotation in a second, opposite direction and, conversely, the second freewheel unit blocks a rotation of the spindle nut in the first direction and permits a rotation in the second, opposite direction in a corresponding manner.

In one embodiment, a pin protrudes downwards at the lower end of the threaded spindle drive, which pin forms a positive connection with the piston end of a single-acting actuating piston of the control device, which actuating piston is axially displaceable along the longitudinal axis of the piston rod, so that a rotary movement of the spindle can be transmitted to the actuating piston and vice versa.

The actuating piston is axially displaceable along this pin and has at least one positive locking element on its outside in the circumferential direction, which positive locking element extends along the longitudinal axis of the piston rod over an axial height of only one freewheel unit, so that in a first setting position of the actuating piston the actuating piston interacts with the first freewheel unit and in a second setting position with the second freewheel unit. Due to the non-self-locking threaded spindle drive, the forces occurring during a stroke movement of the piston rod result, as a rule, in the two piston rod sections being pushed together or pulled apart and thus in a relative rotation of the spindle and the nut.

Depending on the freewheel unit via which, at any one point in time, the pin, which is connected to the spindle in a rotationally fixed manner, is coupled to the nut via the actuating piston—the freewheel unit which is locked in this direction or the freewheel unit which is freewheeling in this direction —, the length of the piston rod changes or precisely not, as otherwise the change in length is blocked by the freewheel unit. The hydraulic pressure in the hydraulic working chamber of the control unit can be used to control the setting position of the actuating piston and thus the length adjustment.

A similar length adjustment device is also known from A50930/2015, whereby in this length adjustment device the length adjustment device comprises a non-self-locking ball screw drive by means of which the friction within the length adjustment device can be reduced.

In a second embodiment described in detail in A50725/2015, the freewheel units are each formed by a specially constructed sleeve, as well as a pin which interacts with the sleeve and which can be displaced radially outwardly, wherein each pin can be displaced radially outwardly with the aid of a respective setting element which can be actuated hydraulically depending on the applied oil pressure, so that the pin is in engagement with the sleeve and the direction of rotation associated with the sleeve is locked, or the pin can be retracted radially inwardly so that the pin is not in engagement with the sleeve and the associated direction of rotation is unblocked.

In the same way as the length adjustment mechanisms with a self-locking threaded spindle drive described above, the length adjustment mechanisms described in A50725/2015 and A50930/2015 can also be used in a piston rod in accordance with the invention, wherein the electromagnetically actuatable switching valve provided in accordance with the invention for hydraulic actuation of the control device is preferably also located in the hydraulic flow between the piston rod bearing and the control device, in particular between the discharge opening for the hydraulic medium from the larger piston rod bearing and the hydraulic working chamber or the control pressure chambers of the control device and any existing resetting device is omitted or adapted as described above so that an adjustment of the piston rod length is possible almost independently of the hydraulic medium pressure applied.

However, it has been found to be particularly advantageous, in particular in combination with a length adjustment device with a non-self-locking threaded spindle drive, to use a control device with at least one rotary slide as a locking device, i.e. a control device with at least one rotary piston, wherein the rotary slide preferably comprises at least two hydraulic working chambers each with at least one double-acting rotary piston and thus a total of at least four control pressure chambers. The two double-acting rotary pistons are preferably mechanically connected to form a common group of actuating elements, in particular positively coupled in such a way that a rotary movement of a first rotary piston also forcibly effects a rotary movement of a second rotary piston, in particular through the same angle of rotation.

The rotary slide, in particular the group of actuating elements, is preferably connected in a rotationally fixed manner to the spindle nut or the spindle, as in the case of the length-adjustable piston rod described in A50720/2015, depending on whether the spindle nut or the spindle is rotatably mounted in the piston rod, wherein the group of actuating elements is in particular connected to the rotatably mounted threaded spindle drive element.

The rotary axis of the rotary slide is preferably oriented parallel to the longitudinal axis of the piston rod and in particular coincides with it. Each hydraulic working chamber of the rotary slide is preferably divided by an associated, double-acting rotary piston into a first control pressure chamber and a second control pressure chamber, wherein preferably the first control pressure chambers are each connected to the switching valve in a fluid-communicating manner via respective first actuating lines and the second control pressure chambers are connected to the switching valve via second actuating lines.

The electromagnetically actuatable switching valve provided in accordance with the invention preferably has a hydraulic connection for each control pressure chamber, as well as preferably a hydraulic connection via which the switching valve is connected or can be connected in a fluid-communicating manner to the hydraulic medium, and a hydraulic connection via which the switching valve is connected or can be connected in a fluid-communicating manner to the drainage line.

The switching valve is preferably constructed so as to connect the first control pressure chambers to the hydraulic medium supply line in a fluid-communicating manner and to drain the second control pressure chambers in a first switching state, and to drain the first control pressure chambers and to connect the second control pressure chambers to the hydraulic medium supply line in a fluid-communicating manner in a second switching state.

In the first switching state, the return flow of hydraulic medium from at least one first control pressure chamber is preferably blocked, in particular by means of a non-return valve arranged between the switching valve of the control device, wherein the non-return valve is preferably arranged in one of the first actuating lines. A hydraulic medium return flow from at least one second control pressure chamber is also preferably blocked in a corresponding manner in the second switching state of the switching valve, in particular by means of a non-return valve arranged between the switching valve and the control device, wherein the non-return valve is preferably arranged in one of the second actuating lines.

By blocking the hydraulic medium backflow from at least one of the respective control pressure chambers, a rotary movement of the group of actuating elements can be prevented and thereby a rotary movement of the threaded spindle drive element which is connected to the group of actuating elements in a rotationally fixed manner, as a result of which the current piston rod length is fixed or the length adjustment device is locked.

By actuating the control device, in particular by switching the control device from the first control state to the second control state, in particular by means of the electromagnetically actuatable switching valve provided in accordance with the invention, the locking of the length adjustment device is released and a reversal of the pressure conditions between each of the first control pressure chambers and the associated second control pressure chambers can be effected. As a result of this, a rotary movement of the associated rotary pistons about the axis of rotation and thus a rotary movement of the group of actuating elements, and of the threaded spindle drive element connected thereto in a rotationally fixed manner, is possible until the rotary pistons reach a stop within their hydraulic working chamber or until a maximum or minimum effective piston rod length is reached.

In a further advantageous embodiment of a piston rod of adjustable length in accordance with the invention, the control device comprises more than one hydraulic working chamber and more than one hydraulically actuatable actuating element, preferably more than one double-acting actuating element, in particular more than one double-acting rotary piston, wherein in particular an actuating element is associated with each hydraulic working chamber, wherein in particular each actuating element divides the associated hydraulic working chamber into a first control pressure chamber and a second control pressure chamber. At least one first control pressure chamber and at least one second control pressure chamber, in particular the two control pressure chambers of a common hydraulic working chamber, are preferably connected in a fluid-communicating manner or can be connected to the switching valve via a respective non-return valve for blocking a return flow from the control pressure chamber.

A reciprocating piston engine in accordance with the invention, in particular a reciprocating piston internal combustion engine in accordance with the invention, having at least one length-adjustable piston rod, has a length-adjustable piston rod in accordance with the invention.

A vehicle in accordance with the invention with a reciprocating piston engine, in particular with a reciprocating piston internal combustion engine, comprises a reciprocating piston engine in accordance with the invention with at least one length-adjustable piston rod in accordance with the invention.

These and other features and advantages are evident not only from the claims and from the description but also from the drawings, wherein the individual features may each be realized individually or in groups, in the form of sub-combinations in an embodiment of the invention, and may represent an advantageous and protectable embodiment for which protection is also claimed, as long as it is technically reasonable.

In the following, the invention is explained in more detail by means of several non-limiting example embodiments, which are schematically illustrated in the figures, whereby further features and advantages result from the illustrated example embodiments in connection with the corresponding figures.

Figure 2:
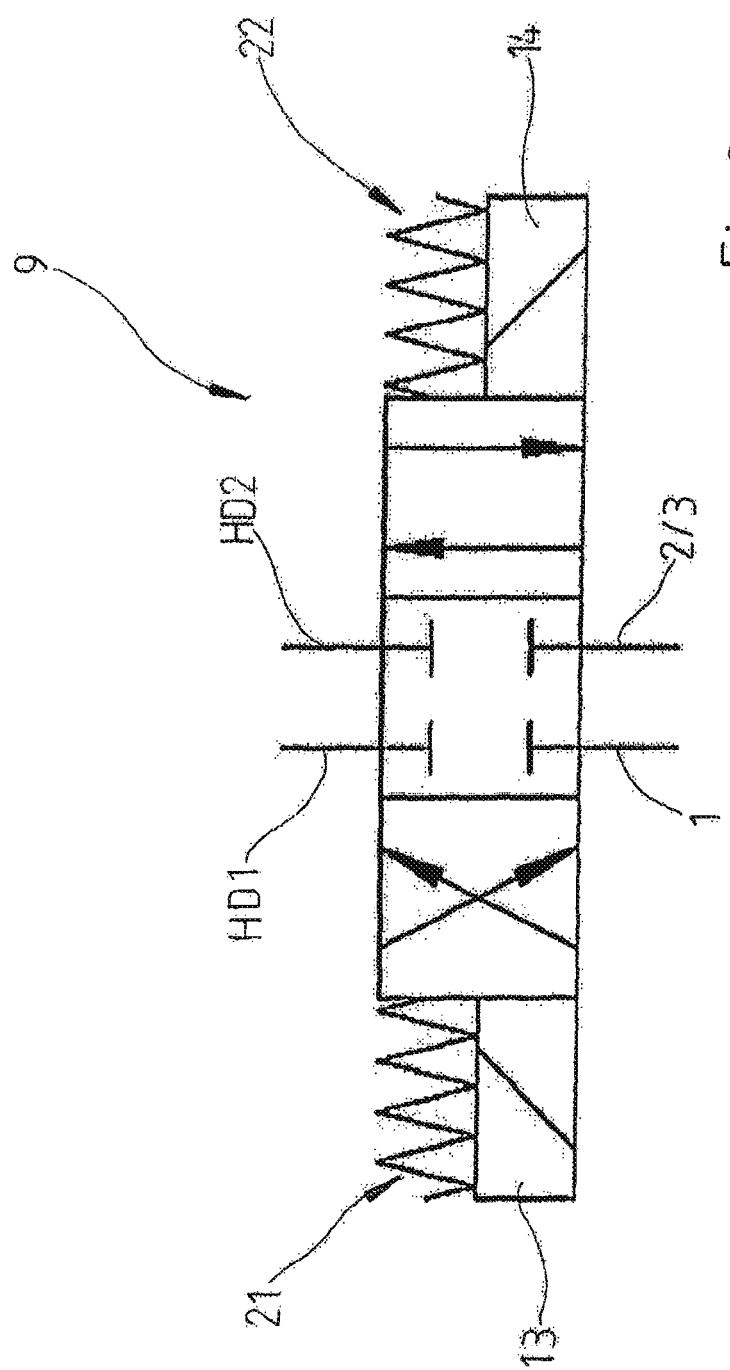
Figure 3:
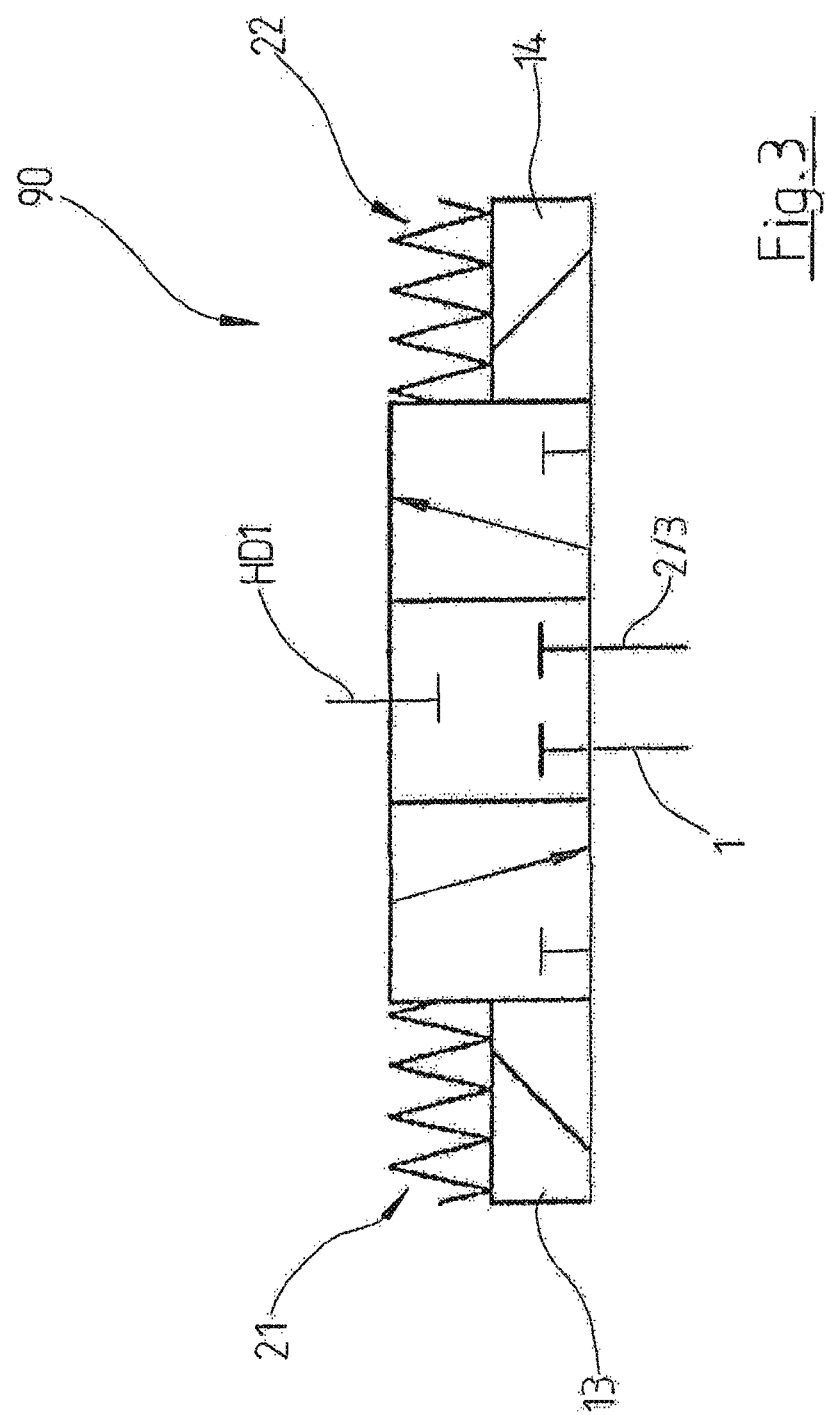
Figure 4:
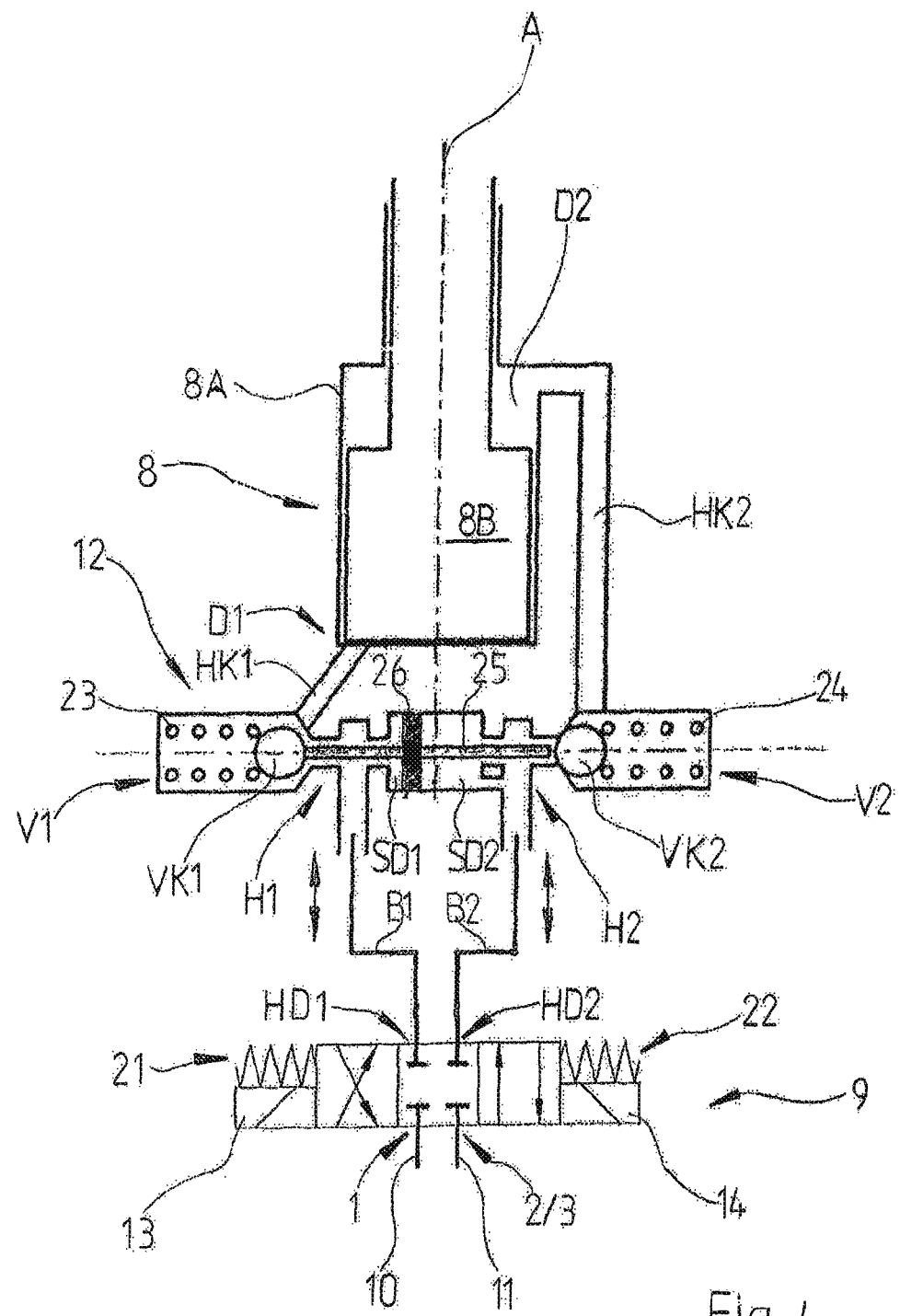
Figure 5:
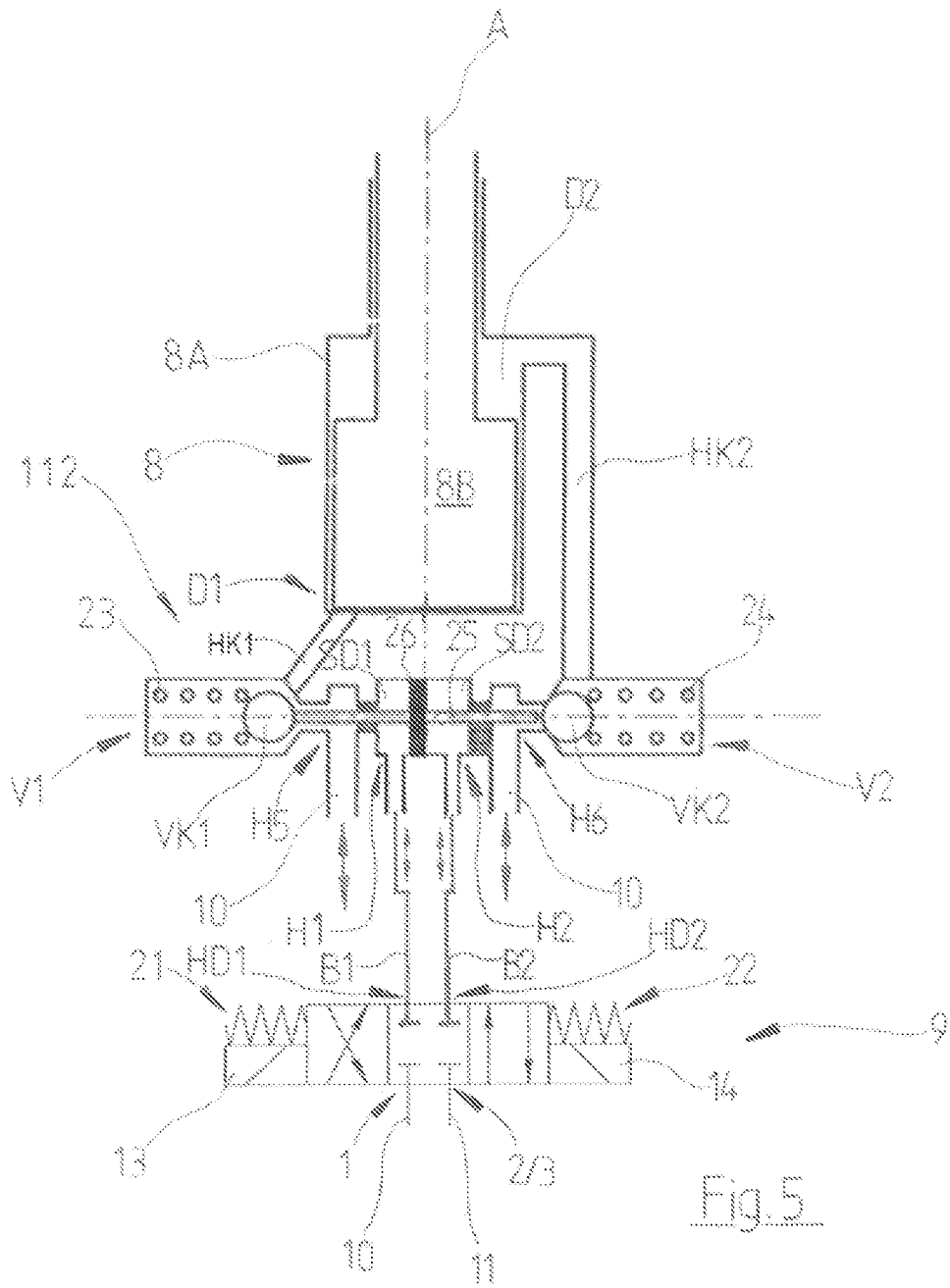
Figure 6A:
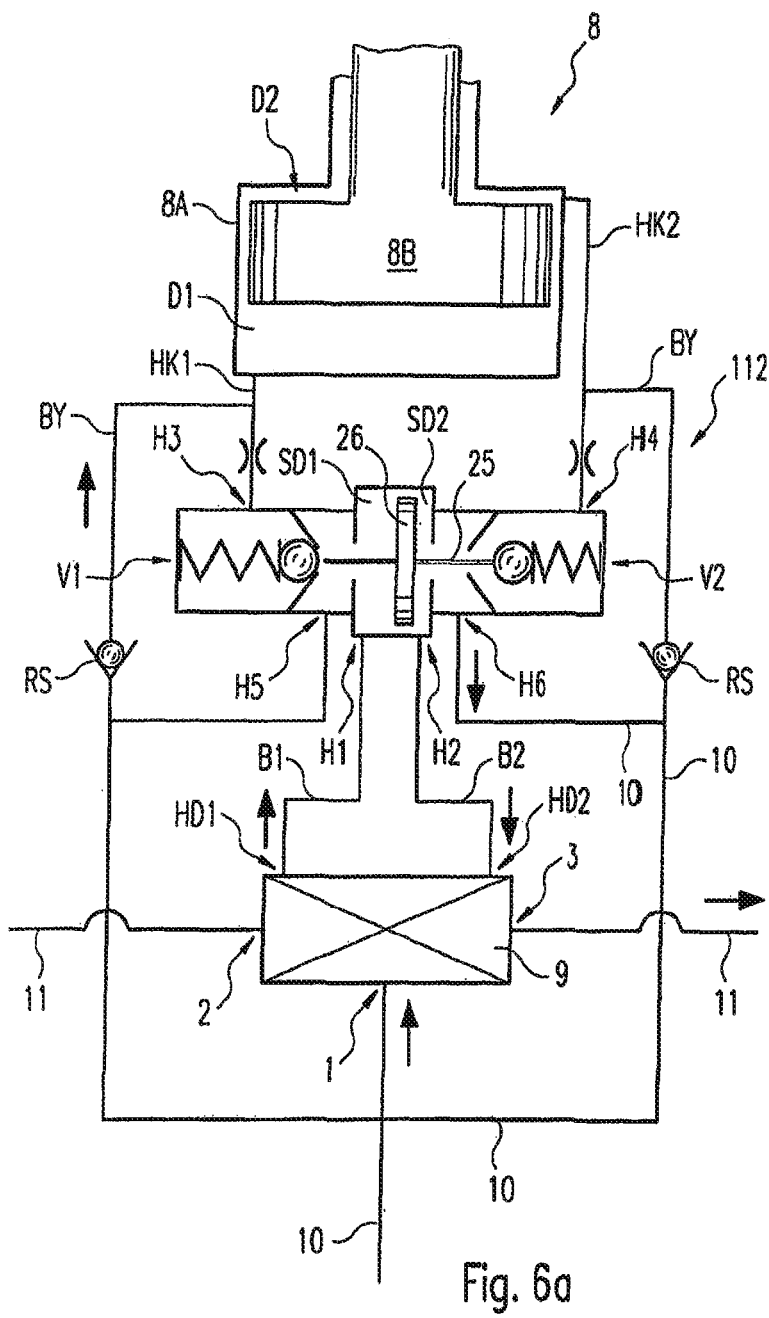
Figure 6B:
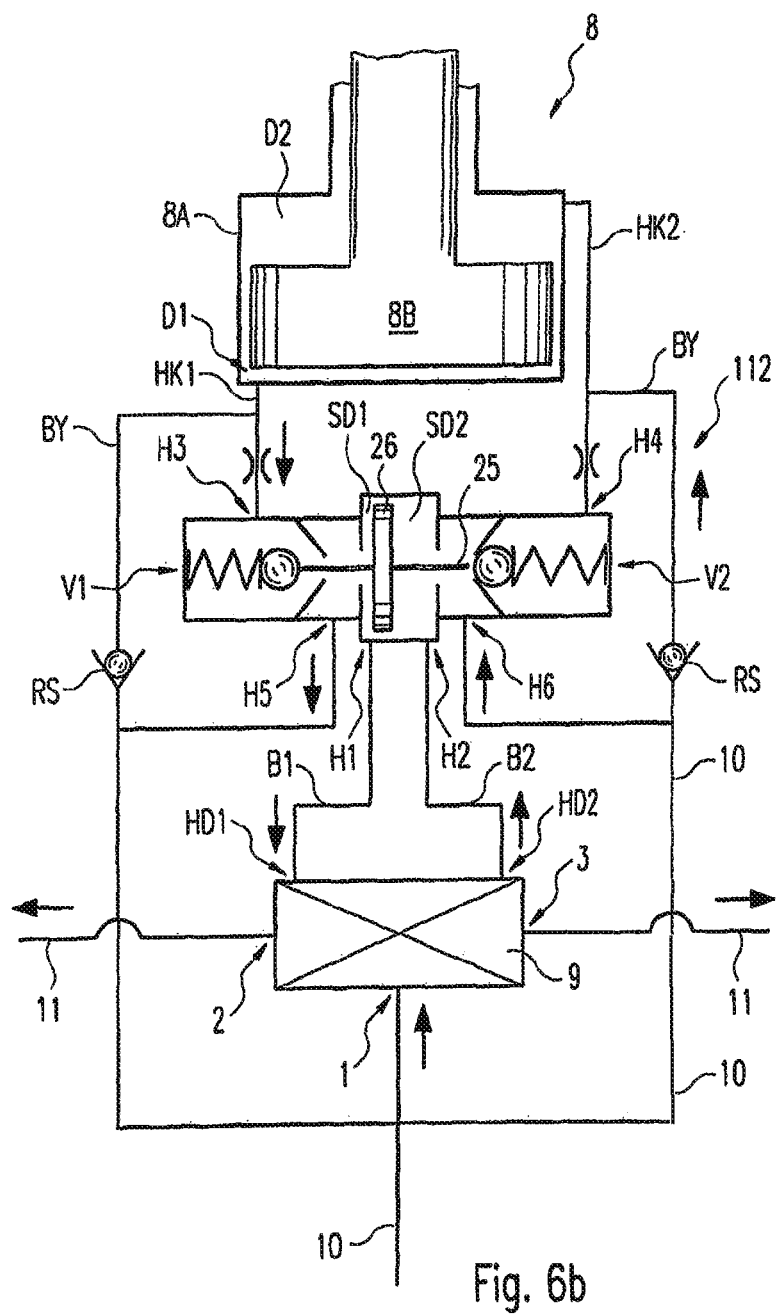

FIG. 1 shows a schematic diagram of a first example embodiment of a length-adjustable piston rod in accordance with the invention, FIG. 2 shows a second example embodiment of an electromagnetically actuatable switching valve for a piston rod in accordance with the invention, FIG. 3 shows a second example embodiment of an electromagnetically actuatable switching valve for a piston rod in accordance with the invention, FIG. 4 shows a schematic diagram of the hydraulic system of the piston rod in accordance with the invention of FIG. 1, FIG. 5 shows a schematic diagram of the hydraulic system of a second example embodiment of a piston rod in accordance with the invention with a hydraulic length adjustment device, FIG. 6a shows a schematic diagram of the hydraulic system of a third example embodiment of a piston rod in accordance with the invention with a hydraulic length adjustment device in a first control state, FIG. 6b shows the hydraulic system of FIG. 6a in a second control state, FIG. 7a shows a schematic diagram of a fourth example embodiment of a piston rod in accordance with the invention with a mechanical length adjustment device with a threaded spindle drive, FIG. 7b shows a plan view of the control device constructed as a rotary slide for locking the length adjustment device of the piston rod of FIG. 7a in accordance with the invention, FIG. 8a shows a schematic diagram of the hydraulic system of the piston rod in accordance with the invention of FIG. 7a in a first control state and FIG. 8b shows a schematic diagram of the hydraulic system of FIG. 8a in a second control state.

FIG. 1 shows a schematic diagram of a first example embodiment of a length-adjustable piston rod 7 in accordance with the invention for a reciprocating piston engine not shown here. A smaller piston rod eye 4 is provided at the upper end of the piston rod 7 for connection to a piston of a reciprocating piston engine and a larger piston rod eye 5 at the lower end for connection to a crankshaft of the reciprocating piston engine.

In accordance with the invention, the piston rod 7 has a length adjustment device 8 by means of which an effective length L of the piston rod can be set. In order to control the length adjustment device 8, a hydraulically actuatable control device 12 is provided, which can be switched between at least two control states, as well as an electromagnetically actuatable hydraulic switching valve 9 for hydraulically actuating the control device.

The control device 12 can be actuated with the aid of the electromagnetically actuatable hydraulic switching valve 9. In particular, by hydraulic actuation of the control device by means of the switching valve 9, the control device 12 can be switched from a first control state to a second control state, wherein a length adjustment of the piston rod 7 can be brought about by changing the control state of the control device 12. The actuation of the control device 12 can be effected by switching the switching valve 9 from a first switching state to a second switching state.

In order to enable a length adjustment of the piston rod 7, in the example embodiment shown in FIG. 1 the piston rod 7 is divided and comprises a first piston rod section 7A and a second piston rod section 7B, wherein the two piston rod sections 7A and 7B can be moved relative to one another along a longitudinal axis A of the piston rod 7 in order to adjust the effective piston rod length L. In particular, the first piston rod section 7A and the second piston rod section 7B can be telescopically pushed into one another or out of one another, wherein the upper piston rod section 7B is guided in the lower piston rod section 7A.

The distance between a first axis of rotation, about which a piston of a reciprocating piston engine can be rotatably mounted in the smaller piston rod eye 4 by means of a piston pin not shown here, and a second axis of rotation, about which the piston rod 7 can be rotatably connected to the crankshaft with the larger piston rod eye 5, defines an effective length of the piston rod 7, wherein in the case of this piston rod 7 in accordance with the invention a change in the effective piston rod length L also leads to a change in the absolute piston rod length.

By changing the effective piston rod length L, in particular by adjusting the effective piston rod length L, the compression ratio can be changed in a reciprocating piston engine, in particular in a reciprocating piston internal combustion engine, since by adjusting the effective piston rod length L the top dead center of the piston movement is moved.

FIG. 2 shows schematically the fundamental structure of a switching valve 9 constructed for hydraulic actuation of the control device of a length-adjustable piston rod 7 in accordance with the invention, wherein the electromagnetically actuatable switching valve 9 shown in FIG. 2 is constructed in particular for the hydraulic actuation of a control device 12 with at least one double-acting actuating element, such as for example the control device of the piston rod 7 in accordance with the invention shown in FIG. 1.

The example embodiment shown in FIG. 2 of an electromagnetically actuatable switching valve 9 for hydraulic actuation of a control device with a double-acting actuating element has a first hydraulic connection 1, a second hydraulic connection 2/3 as well as a third hydraulic connection HD1 and a fourth hydraulic connection HD2 and is constructed as a 4/3-way valve.

In this case, the first hydraulic connection 1 serves as valve inlet, the second hydraulic connection 2/3 as valve outlet or as a second and a third outlet. The third hydraulic connection HD1 and the fourth hydraulic connection HD2 each serve as switching connections HD1, HD2 for controlling or actuating the control device, whereby the control device can be actuated hydraulically via the two switching connections HD1 and HD2.

For electromagnetic actuation, the switching valve 9 has a first coil 13 and a second coil 14, whereby a resetting device 21 and 22 is further assigned to each coil, respectively, in order to be able to ensure a defined switching state in each case when coils 13 or 14 are not energized.

If the first coil 13 is electrically energized, the switching valve is switched to a second switching state, in which the first hydraulic connection 1 is connected with the fourth hydraulic connection HD2 in a fluid-communicating manner, i.e. the second switching connection HD2, and in which the third hydraulic connection HD1, i.e. the first switching connection HD1, is connected with the second hydraulic connection 2/3 in a fluid-communicating manner, i.e. with an outlet 2, 3.

In a corresponding manner, when the second coil 14 is energized, the switching valve 9 is switched to a first switching state, in which the first hydraulic connection 1 is connected in a fluid-communicating manner to the first switching connection HD1 and in which the second switching connection HD2 is connected in a fluid-communicating manner to the second hydraulic connection, in particular to an outlet 2 or 3, respectively, in a fluid-communicating manner.

In order to generate the electric current required for the electric switching of the electromagnetically actuatable switching valve 9, the piston rod 7 of FIG. 1 in accordance with the invention has an induction device 88 not shown in FIG. 1, by means of which the required electric current or the required corresponding electric voltage for the actuation of the switching valve 9 can be generated by interaction with a magnet device 89 arranged in the crankcase of an associated reciprocating piston internal combustion engine.

In particular, if the control device of a piston rod in accordance with the invention only comprises a single-acting actuating element, a 3/2-way or a 3/3-way control valve 90, as shown schematically and by way of an example in FIG. 3, can also be used instead of the electromagnetically actuatable 4/2- or 4/3-way valve 9 in order to actuate the control device.

The electromagnetically actuatable switching valve 90 shown in FIG. 3 has a total of only three hydraulic connections, in particular only a first switching connection HD1, wherein in a first switching state of the switching valve 90 the first hydraulic connection 1 is connected with the first switching output HD1 in a fluid-communicating manner, and in a second switching state with the outlet 2, 3.

FIG. 4 shows schematically and by way of an example the hydraulic system for adjusting the length of the length-adjustable piston rod 7 of FIG. 1 in accordance with the invention, wherein the piston rod 7 comprises a hydraulic length adjustment device 8 with a hydraulic piston 8B and a hydraulic cylinder 8A, wherein the hydraulic piston 8B is fixedly connected to the upper piston rod section 7B and the hydraulic cylinder 8A of the length adjustment device 8 is fixedly connected to the lower piston rod section 7A.

The hydraulic piston 8B of the length adjustment device 8 is constructed as a double-acting hydraulic piston 8B and divides the hydraulic cylinder 8A of the length adjustment device 8 into a first pressure chamber D1 and a second pressure chamber D2, i.e. into a first hydraulic working chamber D1 and a second hydraulic working chamber D2.

Depending on the position of the hydraulic piston 8B within the hydraulic cylinder 8A the effective piston rod length L results, whereby the position of the hydraulic piston 8B in the hydraulic cylinder 8A depends on the pressure difference between the first pressure chamber D1 and the second pressure chamber D2 of the length adjustment device 8.

In order to control the pressure difference in the two pressure chambers D1, D2 of the length adjustment device 8, the control device 12 is provided, which can be hydraulically actuated by means of the electromagnetically actuatable switching valve 9 from FIG. 2.

The first hydraulic connection 1, i.e. the inlet 1, is connected in a fluid-communicating manner to a hydraulic medium supply line 10 of the piston rod 7, via which the electromagnetically actuatable switching valve 9 can obtain the hydraulic medium required for the hydraulic actuation of the control device 12, wherein the oil used for lubrication of the reciprocating piston engine is used as the hydraulic medium, which can in particular be taken from the piston rod bearing. Thus, hydraulic medium can be supplied, via the hydraulic medium supply line 10 and the switching valve 9, to the control device 12, and via this to a respective one of the two pressure chambers D1, D2 of the length adjustment device 8.

The second hydraulic connection, i.e. the outlets 2/3 of the switching valve 9, are connected to a drainage line 11 of the piston rod so that hydraulic medium can be discharged and, in particular, a hydraulic pressure can be reduced in a respective one of the two pressure chambers D1 and D2 of the length adjustment device.

In the hydraulic system shown in FIG. 4, the third hydraulic connection HD1 of the switching valve 9, i.e. the first switching connection HD1, is connected to a first hydraulic connection H1 of the control device 12 via a first actuating line B1, and the fourth hydraulic connection HD2 of the switching valve 9, i.e. the second switching connection HD2, is connected to the second hydraulic connection H2 of the control device 12 via a second actuating line B2.

Hence, depending on the switching state of the electromagnetically actuatable switching valve 9, either the first hydraulic connection H1 of the control device 12 is connected to the hydraulic medium supply line 10 or to the drainage line 11 in a fluid-communicating manner via the first actuating line B1, or the second hydraulic connection H2 is connected to the drainage line 11 or the hydraulic medium supply line 10 in a fluid-communicating manner via the second actuating line B2.

Depending on which of the two hydraulic connections H1 or H2 of the control device 12 is connected in a fluid-communicating manner to the hydraulic medium supply line 10 of the piston rod 7, in which hydraulic medium is guided at a certain pressure, and hence in dependence upon the switching state of the electromagnetically actuatable switching valve 9, in the hydraulic working chamber of the control device 12, which is divided by a double-acting linear piston 26 into a first control pressure chamber SD1 and a second control pressure chamber SD2, a pressure difference between the two control pressure chambers SD1 and SD2 is established, by means of which the linear piston 26 is either moved into a first actuating position to the right, or, as shown here, into a second actuating position to the left.

In this control device 12, the actuating piston 26 is fixedly connected to a connecting rod 25 which serves as a connecting device between a first ball globe valve V1 and a second ball globe valve V2 and which is constructed to lift, respectively from one of the two valves V1 or V2, an associated valve body VK1 or VK2 from a valve seat against a restoring force applied by a return spring 23, 24. Here, the length of the connecting rod 25 is dimensioned in such a way that only one valve body VK1 or VK2 can be lifted from the valve seat, so that the respective other valve body VK1 or VK2 is pressed against the valve seat by the associated return spring 23 or 24.

If a valve body VK1 or VK2 is pushed away from the valve seat by means of the connecting rod 25, hydraulic medium is pressed, due to the external forces acting on the piston rod 7 during a working stroke, via a hydraulic channel HK1 or HK2, out of the pressure chamber D1 or D2 of the length adjustment device 8, which pressure chamber is connected in a fluid-communicating manner to the associated valve V1 or V2, wherein the hydraulic medium flows off via one of the two hydraulic connections H1 or H2 and the associated actuating line B1 or B2 and through the electromagnetically actuatable switching valve 9 via the outlet 2, 3 to the drainage line 11. By means of this, a pressure in the respective pressure chamber D1 or D2 is reduced, i.e. the respective pressure chamber D1 or D2 is drained and the hydraulic piston 8B and the hydraulic cylinder 8A move with respect to each other.

Due to the resulting suction effect, hydraulic medium is at the same time sucked into the other, non-drained pressure chamber D2 or D1 via the hydraulic medium supply line 10 through the switching valve 9, the associated actuating line B2 or B1, through the other ball globe valve V2 or V1, whereby the suction effect is so great that the restoring forces of the return springs 24, 23, which press the valve bodies VK2 and VK1 respectively against the valve seat, can be overcome.

Since a hydraulic medium return flow is not possible or is blocked, the pressure chamber D2 or D1 is gradually filled with each stroke, while hydraulic medium is gradually discharged from the other pressure chamber D1 or D2. As a result of this, the effective piston rod length L gradually changes until the final piston rod length is reached.

In FIG. 4 the electromagnetically actuatable switching valve is shown in a third switching state, in which hydraulic medium cannot be supplied further via the hydraulic medium supply line 10 in either of the two pressure chambers D1, D2, nor can hydraulic medium be discharged to drainage line 11, so that the length adjustment device 8 is locked in its current setting or the set piston rod length L is fixed.

FIG. 5 shows the hydraulic system of a further example embodiment of a length-adjustable piston rod in accordance with the invention, with a hydraulic length adjustment device 8, which is similar to the hydraulic system described on the basis of FIG. 4, but in contrast to the latter comprises a control device 112 constructed in a different manner, which has a total of 6 hydraulic connections H1 to H6, in particular additionally a fifth hydraulic connection H5 and a sixth hydraulic connection H6, which are each directly connected in a fluid-communicating manner to the hydraulic medium supply line 10.

This means that the hydraulic medium required for supplying the two pressure chambers D1 and D2 of the length adjustment device 8 can be guided past the switching valve 9 to the control device 112, while the hydraulic medium supplied to the switching valve 9 via the hydraulic medium supply line 10 only serves to supply the two control pressure chambers SD1 and SD2.

The fifth hydraulic connection H5 and the sixth hydraulic connection H6 are in particular fluidically separated from the hydraulic working chamber of the control device 112, in particular from the two control pressure chambers SD1 and SD2 of the control device 112.

This hydraulic system has the advantage that the switching valve 9 is hydraulically decoupled from the length adjustment device 8, so that the pressures arising in the length adjustment device 8, which may well be greater than 1,200 bar or in some cases even greater than 1,500 bar, do not act on the electromagnetically actuatable switching valve 9, so that the electromagnetically actuatable switching valve 9 can be constructed in a particularly simple manner.

FIGS. 6a and 6b show a further example embodiment of a hydraulic system of a length-adjustable piston rod in accordance with the invention, with a hydraulic length adjustment device 8 and the control device 112 from FIG. 5, as well as an electromagnetically actuatable switching valve 9 in accordance with FIG. 2.

In contrast to the hydraulic system shown in FIG. 5, the first pressure chamber D1 of the length adjustment device 8 and the second pressure chamber D2 of the length adjustment device 8 are each additionally connected via a bypass line BY and a non-return valve RS directly to the hydraulic medium supply line 10 in a fluid-communicating manner. Further, in contrast to the variants of embodiments of the electromagnetic switching valve 9 described above, this switching valve 9 has two outlets 2 and 3 and not just one outlet.

The first hydraulic connection 1, which is constructed as an inlet, is connected to the hydraulic medium supply line 10 in a fluid-communicating manner. The first outlet 2 and the second outlet 3 are each connected with the drainage line 11 in a fluid-communicating manner. The first switching connection HD1 is connected in a fluid-communicating manner to the first control pressure chamber SD1 of the control device 112 in a fluid-communicating manner via the first actuating line B1, and the second switching connection HD2 is connected to the second control pressure chamber SD2 via a second actuating line B2.

FIG. 6a shows the hydraulic system in a first control state of the control device 112 or in a first switching state of the electromagnetically actuatable switching valve 9, in which the first hydraulic connection 1 is connected in a fluid-communicating manner with the third hydraulic connection HD1, i.e. connected in a fluid-communicating manner with the first switching connection HD1, so that hydraulic medium is guided via the hydraulic medium supply line 10 through the switching valve 9 via the first actuating line B1 into the first control pressure chamber SD1 of the control device 12, while the second control pressure chamber SD2 of the control device 12 is drained via the second actuating line B2, the second switching connection HD2 and the outlet 3 of the switching valve 9, so that hydraulic medium can flow out of the second control pressure chamber SD2 into the drainage line 11.

Because of this, a pressure difference between the first control pressure chamber SD1 and the second control pressure chamber SD2 is present at the double-acting actuating piston 26 of the control device 112, as a result of which the actuating piston 26 is shifted to the first setting position to the right in the hydraulic working chamber of the control device 12. As a consequence, the connecting element 25, which is fixedly connected to the actuating piston 26 and which in this case is constructed as a connecting rod 25, is also moved to the right in relation to the diagram. This lifts the valve body of the right-hand valve V2 from the valve seat against the force of the return spring. As a result, the hydraulic medium, which is under high pressure in the second pressure chamber D2 due to the large forces acting during the stroke movement of the piston rod, can flow via the second hydraulic channel HK2 through the right-hand valve V2 into the hydraulic medium supply line 10, as a result of which the pressure in the second pressure chamber D2 of the length adjustment device 8 is reduced. In particular, the lifting of the valve body from the valve seat of the right-hand valve 2 has the effect that the upper piston rod section 7B, which is firmly connected to the hydraulic piston 8B of the length adjustment device, can freely move upwards during an upwards movement the piston rod, since it is not possible for sufficient pressure and thus resistance to be built up in the second pressure chamber D2 of the length adjustment device 8 in order to keep the hydraulic piston 8B at the bottom. Thus, by means of the lifting of the valve body from the valve seat of the right-hand valve V2, the hydraulic piston 8B of the length adjustment device is effectively released in an upward direction and thus an adjustment of the length of the piston rod towards a larger effective piston rod length is effected.

At the same time a suction effect develops in the first pressure chamber D1 in the hydraulic cylinder 8A of the length adjustment device 8, which leads to the hydraulic medium being sucked into the first pressure chamber D1 of the length adjustment device 8 via the first hydraulic channel HK1, wherein the hydraulic medium is sucked in on the one hand via the bypass line BY and the non-return valve RS and on the other hand via the left-hand valve V1 of the control device 112, as long as the restoring force of the spring 23 has not been chosen too high.

A return flow of hydraulic medium from the first pressure chamber is blocked by the non-return valve RS in the bypass line BY, as well as by the left-hand ball globe valve V1 acting as non-return valve, so that the hydraulic piston 8B and thus the upper piston rod section 7B is prevented from moving downwards during the downward stroke of the piston rod.

During the next upward stroke, hydraulic medium can again be sucked into the first pressure chamber D1, so that with each further stroke, the first pressure chamber D1 of the length adjustment device 8 fills increasingly until the piston rod has reached its maximum effective piston rod length.

If the electromagnetic switching valve 9 is then actuated electrically, for example by a corresponding electric current being generated by means of an induction device 88 present in the piston rod, which is transmitted to the switching valve 9, so that the switching valve 9 switches from the first switching state shown in FIG. 6a to the second switching state shown in FIG. 6b, in which the inlet 1, which is connected to the hydraulic medium supply line 10, is now connected with the fourth hydraulic connection HD2 in a fluid-communicating manner, i.e. is connected to the second switching connection HD2, while the first switching connection HD1 is connected to the drainage line 11, the second control pressure chamber SD2 of the control device 112 is, as a consequence thereof, filled with hydraulic medium and the first control pressure chamber SD1 of the control device 112 is drained. As a result of this, the actuating piston 26 is moved to the left so that the connecting rod 25, which is fixedly connected to the actuating piston 26, is also moved to the left.

As a result of this, the valve body of the right-hand valve V2 of the control device 12 is again pressed against the valve seat by the return spring 24 and a return flow of hydraulic medium from the second pressure chamber D2 of the length adjustment device 8 is blocked. Due to the non-return valve RS, no hydraulic medium can flow out of the second pressure chamber D2 of the length adjustment device 8 via the associated bypass line BY either.

At the same time, the first pressure chamber D1 of the length adjustment device 8 is drained, as the connecting rod 25 lifts the valve body of the left-hand valve V1 from the valve seat, so that hydraulic medium can flow out of the first pressure chamber D1 of the length adjustment device 8 through the control device 112, in particular through the first valve V1, into the hydraulic medium supply line 10.

Since the pressure which is present in the first pressure chamber D1 up to the draining, i.e. up to the switching valve 9 being switched over, is considerably greater, due to the external forces, than the pressure in the hydraulic medium supply line 10, the hydraulic medium flows out of the first pressure chamber D1 into the hydraulic medium supply line 10 instead of hydraulic medium flowing out of the hydraulic medium supply line 10 into the first pressure chamber D1, even at a high engine oil pressure.

Draining the first pressure chamber D1 of the length adjustment device 8 causes the hydraulic piston 8B to be able to be displaced downwards during a downward stroke of the piston rod, in particular after an ignition process, due to the forces acting in the hydraulic cylinder 8A of the length adjustment device 8, as a result of which the hydraulic medium which until then has been located in the first pressure chamber D1 is discharged from the first pressure chamber D1 via the first hydraulic channel, the bypass line BY, as well as via the left-hand valve V1 into the hydraulic medium supply line 10.

At the same time, due to the suction effect created in the second pressure chamber D2 of the length adjustment device 8, hydraulic medium is sucked in via the hydraulic medium supply line 10, via the right-hand valve V2, as well as via the bypass line BY and the second hydraulic channel HK2.

As a result of the return flow out of the second pressure chamber D2 being blocked by the valve body of the second valve V2, which is pressed against the valve seat, as well as by the non-return valve RS, the hydraulic piston 8B is held in its position, as long as the pressure in the second pressure chamber D2 is high enough.

At the next stroke, as long as the second pressure chamber D2 is not yet completely filled, hydraulic medium is sucked in again so that the hydraulic piston 8B and thus the second piston rod section 7B increasingly move downwards until the minimum effective length L of the piston rod is reached.

In the control device 12 illustrated, by way of example, by means of FIGS. 4, 5, 6a and 6b, the actuating piston is arranged axially displaceable in a direction which is perpendicular to the longitudinal axis A of the piston rod 7 in a longitudinal center plane of the piston rod, and the stroke axes of the valve bodies VK1, VK2 of the valves V1 and V2 of the control device coincide with the displacement direction of the actuating piston 26. In order to prevent the valve bodies VK2 and VK2 from lifting off the valve seats due to mass forces generated as a result of the accelerations taking place during the stroke movement of the piston rod, the stroke axes of the valves V1 and V2 can also be arranged in a direction which is perpendicular to the displacement axis of the actuating piston 26, in particular parallel to the longitudinal axis of the crankshaft. Advantageous options for the construction of the control devices 12 and 112 are described in detail in this regard in PCT/EP2016/064193, as well as DE 10 2016 008 306 of the applicant.

FIG. 7a shows a further example embodiment of a piston rod 70 in accordance with the invention, with an alternative length adjustment device 80 with a further example embodiment of a control device 212, as well as an electromagnetically actuatable switching valve 9, wherein the switching valve 9 is constructed as shown in FIG. 2. For a better understanding, the control device 212 is shown in FIG. 7b in a plan view.

Also in this example embodiment of a piston rod 70 in accordance with the invention, the control device serves to control the length adjustment device 80 and the electromagnetically actuatable hydraulic switching valve 9 serves to hydraulically actuate the control device 212. This piston rod 70 in accordance with the invention also comprises a first piston rod section 70A, as well as a second piston rod section 70B, wherein the two piston rod sections 70A and 70B are also axially displaceable relative to each other along the longitudinal axis A of the piston rod 70 and in particular can be telescopically pushed into each other or apart. The piston rod 70 also has a smaller piston rod eye 4 for fixing a piston by means of a piston pin, as well as a larger piston rod eye 5 for connecting the piston rod 70 to a crankshaft of a reciprocating piston engine.

However, in contrast to the example embodiments described above, the length adjustment device 80 is not a hydraulic length adjustment device, but a mechanical length adjustment device 80, which comprises a threaded spindle drive. The second piston rod section 70B forms a spindle nut which is supported in a rotationally fixed but axially displaceable manner in the first piston rod section 70A, and the first piston rod section 70A is coupled to a threaded spindle 81, which is supported in the first piston rod section 70A in a rotatable but axially fixed manner via an axial bearing 82. A relative rotation between the spindle nut formed by the second piston rod section 70B and the threaded spindle 81 causes the effective piston rod length L to be adjusted.

The threaded spindle drive of the length adjustment device 80 is constructed as a non-self-locking threaded spindle drive, so that in principle a length adjustment of the piston rod 70 can be effected by means of the forces acting on the piston rod 70 during a stroke movement, as long as the relative rotation between the threaded spindle 81 and the spindle nut 70B is not blocked.

Via a positive locking pin 83, the threaded spindle 81 is operatively connected in a rotationally fixed manner to the rotatable part of a hydraulically actuatable control device 212 constructed in the form of a rotary slide, wherein the positive locking pin 83 is in particular connected to the double-acting rotary pistons 86 of the rotary slide or the control device 212, which double-acting rotary pistons 86 are mechanically positively coupled to form a group of actuating elements. The rotary slide 212 or the control device 212 comprises an outer rotary slide part 87 which is supported in the first piston rod section 70A in a rotationally fixed manner and which forms a rotary cylinder and in which the two rotary pistons 86, which are mechanically positively coupled to one another to form a common group of actuating elements, are rotatably supported.

The rotary cylinder 87 comprises two hydraulic working chambers, each of which is divided by one of the two double-acting rotary pistons 86 into a first control pressure chamber SD1 and a second control pressure chamber SD2, wherein each of the control pressure chambers SD1, SD2 can be filled with a hydraulic medium via a hydraulic connection HX, or drained via the hydraulic connection HX. Each of the first control pressure chambers SD1 are connected to the electromagnetic, hydraulic switching valve 9 in a fluid-communicating manner via the respective associated hydraulic connection HX and the first actuating lines B1, of which only one is schematically shown here. In a corresponding manner, each of the second control pressure chambers SD2 are connected to the electromagnetic switching valve 9 in a fluid-communicating manner via second actuating lines B2, of which again only one is shown schematically.

As in the example embodiments described above, the electromagnetic switching valve 9 is constructed so as to connect, in a first switching state, the first control pressure chambers SD1, in particular via the first actuating lines B1, to the hydraulic medium supply line 10 in a fluid-communicating manner and at the same time to drain the second control pressure chambers SD2, in particular via the second actuating lines B2, whereby the drainage line is not shown here.

If there is a pressure difference respectively between the first control pressure chamber SD1 and the associated second control pressure chamber SD2 of a common hydraulic working chamber, the rotary pistons 86 can rotate about an axis of rotation, wherein in this example embodiment the axis of rotation coincides with the longitudinal axis of the piston rod 70 and extends in a direction which is perpendicular to the drawing plane in FIG. 7b.

At least a first control pressure chamber SD1 and a second control pressure chamber SD2 can be connected to the hydraulic medium supply line 10 via a non-return valve RS which is arranged downstream of the electromagnetic switching valve 9 (see FIGS. 8a and 8b) in a fluid-communicating manner so that a return flow from the control pressure chamber SD1 or SD2 can be blocked. In this way the rotary pistons 86 or the entire group of actuating elements of the rotary slide 212 can be blocked in their positions according to the same principle as that of the hydraulic piston 8B of the hydraulic length adjustment device 8 described above.

If a movement of the rotary piston 86 is blocked by virtue of the return flow of the hydraulic medium out of one of the two control pressure chambers SD1 or SD2 adjacent to the rotary piston 86 being blocked, a rotary movement of the threaded spindle 81 is also blocked due to the rotationally fixed, positive connection of the control device 212 via the positive locking pin 83, and consequently a length adjustment is blocked.

The electromagnetically actuatable hydraulic switching valve 9 for controlling the rotary slide 212, which has a plurality of hydraulic working chambers and a plurality of double-acting actuating elements 86, is constructed in principle like the electromagnetic switching valve 9 described with reference to FIG. 2 and has in particular a first hydraulic connection 1 constructed as inlet 1, as well as at least a second and preferably a third hydraulic connection constructed as outlet 2 or 3, as well as at least a first switching connection HD1 and a second switching connection HD2. In particular, for each control pressure chamber SD1, SD2 there is provided a corresponding switching connection HD1, HD2, wherein preferably each switching connection HD1 or HD2 is connected to the associated control pressure chamber SD1 or SD2 via an associated actuating line B1, B2 in a fluid-communicating manner.

At least a first control pressure chamber SD1 and a second control pressure chamber SD2, in particular the two control pressure chambers SD1 and SD2 of a common hydraulic working chamber, are connected in a fluid-communicating manner to the electromagnetic switching valve 9 via a respective non-return valve RS in order to block a return flow of hydraulic medium.

As in the example embodiments described above, the first hydraulic connection 1, which forms the inlet of the electromagnetic valve, is preferably connected in a fluid-communicating manner to the hydraulic medium supply line 10, and the second hydraulic connection or the outlets 2, 3 of the electromagnetically actuatable switching valve are connected in a fluid-communicating manner to a drainage line.

FIGS. 8a and 8b show, for a better understanding, the hydraulic system of the piston rod 70 from FIG. 7a in accordance with the invention in schematic representation, whereby FIG. 8a shows the hydraulic system in a first control state of the control device 212 or in a first switching state of the switching valve 9, and FIG. 8b in a second state.

In the first state shown in FIG. 8a, the first hydraulic connection 1 or the inlet 1, which is connected to the hydraulic medium supply line 10 in a fluid-communicating manner, is respectively connected in a fluid-communicating manner to the hydraulic connections which form the first switching connections HD1 and which are connected to the first control pressure chambers SD1 via first actuating lines B1 in a fluid-communicating manner, so that in this switching state the first control pressure chambers SD1 are filled with hydraulic medium.

In a corresponding manner, the hydraulic connections of the electromagnetic switching valve 9, which form the second switching connections HD2 and which are connected in a fluid-communicating manner to the second control pressure chambers SD2 via second actuating lines B2, are connected to the drainage line 11 in a fluid-communicating manner so that the second control pressure chambers SD2 are drained.

As with the previously described hydraulic length adjustment device 8 of the previously described length-adjustable piston rod 7 in accordance with the invention, a counter-clockwise rotation of the group of actuating elements with the two rotary pistons 86 is thus possible, as a result of which hydraulic medium can be sucked into the first control pressure chambers SD1 and, in a corresponding manner, hydraulic medium can be discharged out of the second control pressure chambers SD2 via the drainage line 11 until each of the control pressure chambers SD1 are completely filled and the associated effective piston rod length L is reached.

In a corresponding manner, in the second control state or switching state of the hydraulic system (see FIG. 8b), the first control pressure chambers SD1 are connected with the drainage line 11 via the electromagnetically actuatable switching valve 9 in a fluid-communicating manner and the first control pressure chambers SD1 with the hydraulic medium supply line 10. In a corresponding manner, a clockwise rotation of the rotary pistons 86 is possible, whereby with each working stroke hydraulic medium is sucked into the second control pressure chambers SD2 until these are completely filled and hydraulic medium is discharged out of the first control pressure chambers SD1 into the drainage line 11 until the corresponding effective piston rod length L is reached, which is the case when the rotary pistons 86 are each located at the stops of the rotary cylinder 87 or the second piston rod section 70B strikes.

Of course, a large number of further modifications of the embodiments described herein are possible without departing from the contents of the claims.

By using an electromagnetically actuatable, hydraulic switching valve, hydraulically actuatable control devices can be actuated almost independently of the hydraulic medium pressure level and thus in particular independently of the operating condition of the reciprocating piston engine, as a result of which a greater flexibility in the length adjustment of the piston rod can be achieved and thus the independent change of the compression ratio independently of the operating condition of a reciprocating piston engine, in particular a reciprocating piston internal combustion engine, can become possible.

LIST OF REFERENCE SIGNS

1 First hydraulic connection of the switching valve/inlet
2 Second hydraulic connection of the switching valve/first outlet
3 Second hydraulic connection of the switching valve/second outlet
4 Smaller piston rod eye
5 Larger piston rod eye
7, 70 Length-adjustable piston rod in accordance with the invention
7A, 70A First piston rod section
7B, 70B Second piston rod section
8, 80 Length adjustment device
8A Hydraulic cylinder of the length adjustment device
8B Hydraulic piston of the length adjustment device
9, 90 Electromagnetically actuatable switching valve
10 Hydraulic medium supply line
11 Drainage line
12, 112, 212 Control device
13 First coil
14 Second coil
21 First resetting device
22 Second resetting device
23 Resetting spring of the first valve of the control device
24 Resetting spring of the second valve of the control device
25 Connecting rod of the control device
26 Double-acting linear piston
81 Threaded spindle
82 Axial bearing
83 Positive locking pin
86 Rotary piston
87 Rotary cylinder
88 Induction device
89 Magnet device
A Longitudinal axis of the piston rod
B1 First actuating line
B2 Second actuating line
BY Bypass line
D1 First pressure chamber of the length adjustment device
D2 Second pressure chamber of the length adjustment device
H1 First hydraulic connection of the control device
H2 Second hydraulic connection of the control device
H3 Third hydraulic connection of the control device
H4 Fourth hydraulic connection of the control device
H5 Fifth hydraulic connection of the control device
H6 Sixth hydraulic connection of the control device
HD1 Third hydraulic connection of the switching valve/first switching connection
HD2 Fourth hydraulic connection of the switching valve/second switching connection
HK1 First hydraulic channel
HK2 Second hydraulic channel
HX Xth hydraulic connection of the control device
L Effective piston rod length
RS Non-return valve
SD1 First control pressure chamber of the control device
SD2 Second control pressure chamber of the control device
V1 First valve of the control device
V2 Second valve of the control device
VK1 Valve body of the first valve of the control device
VK2 Valve body of the second valve of the control device

The invention claimed is:

1. A length-adjustable piston rod for a reciprocating piston internal combustion engine, comprising:
a length adjustment device operable to adjust an effective length of the piston rod;
a control device that is hydraulically actuatable and which can be switched between at least two control states for controlling the length adjustment; and
a hydraulic switching valve that is electromagnetically actuatable for hydraulic actuation of the control device,
wherein the hydraulic switching valve can be actuated inductively and is electrically switchable, wherein the piston rod comprises an induction device for inductively actuating the hydraulic switching valve, and wherein the hydraulic switching valve is electrically connected or can be electrically connected to the induction device.

2. The length-adjustable piston rod according to claim 1, wherein:
the piston rod comprises a first piston rod section and a second piston rod section; and
the first and second piston rod sections are movable relative to one another along a longitudinal axis of the piston rod for adjusting the effective length of the piston rod.

3. The length-adjustable piston rod according to claim 2, wherein the length adjustment device comprises a spindle drive with a spindle nut and a spindle, wherein one of the first and second piston rod sections is mechanically coupled to the spindle nut and the other piston rod section is mechanically coupled to the spindle, and wherein a relative rotation between the spindle and the spindle nut causes an adjustment of the effective length of the piston rod.

4. The length-adjustable piston rod according to claim 3, wherein the length adjustment device comprises a self-locking threaded spindle drive with a threaded spindle and a threaded spindle nut, wherein the control device is constructed as an actuator device or is part of an actuator device, and wherein an relative rotation between the threaded spindle and the threaded spindle nut can be effected by actuating the control device by switching the control state of the control device by the hydraulic switching valve.

5. The length-adjustable piston rod according to claim 3, wherein the length adjustment device comprises at least one of a non-self-locking threaded spindle drive and a non-self-locking ball screw drive with a spindle and a spindle nut, wherein the control device is constructed as a hydraulically actuatable locking device or is part of a locking device, and wherein actuating the control device can effectuate one or more of: a locking, a release of the locking, and a change in the effective length of the piston rod.

6. The length-adjustable piston rod according to claim 5, wherein the control device comprises more than one hydraulic working chamber and more than one hydraulically actuatable actuating element, wherein an actuating element is associated with each hydraulic working chamber, and wherein each actuating element divides the associated hydraulic working chamber into a first control pressure chamber and a second control pressure chamber,
and wherein at least a first control pressure chamber and at least a second control pressure chamber of the same, common hydraulic working chamber, are each connected or can be connected to the hydraulic switching valve in a fluid-communicating manner by a respective non-return valve for blocking a return flow from the first and second control pressure chambers.

7. The length-adjustable piston rod according to claim 1, wherein a length adjustment of the piston rod can be effected by changing a control state of the control device, wherein an actuation of the control device can be effected by switching the hydraulic switching valve from a first switching state to a second switching state.

8. The length-adjustable piston rod according to claim 1, wherein the control device comprises at least one actuating element that is hydraulically actuatable, wherein the actuating element is arranged displaceably in a hydraulic working chamber between at least a first actuating position and a second actuating position, and wherein the actuating element is in the first actuating position when the control device is in a first control state, and in the second actuating position when the control device is in a second control state.

9. The length-adjustable piston rod according to claim 1, wherein the piston rod comprises a hydraulic medium supply line and a drainage line.

10. The length-adjustable piston rod according to claim 9, wherein the control device comprises at least one slide valve or is constructed as a slide valve, and wherein the slide valve is an axial slide valve with an axially displaceable actuating piston or a rotary slide valve with a rotary piston supported rotatably about an axis.

11. The length-adjustable piston rod according to claim 10, wherein the slide valve comprises at least one single-acting actuating element or a single-acting hydraulic piston, wherein the single-acting hydraulic piston is axially displaceable in a hydraulic working chamber of the control device, and wherein the hydraulic working chamber of the control device is a single-acting hydraulic cylinder.

12. The length-adjustable piston rod according to claim 11, wherein the hydraulic switching valve comprises at least three hydraulic connections, wherein the hydraulic switching valve is constructed as a 3/2-way valve or as a 3/3-way valve, wherein a first hydraulic connection of the hydraulic switching valve is connected or can be connected to the hydraulic medium supply line in a fluid-communicating manner, wherein a second hydraulic connection of the hydraulic switching valve is connected or can be connected to the drainage line in a fluid-communicating manner, and wherein a third hydraulic connection of the hydraulic switching valve is connected or can be connected to the hydraulic working chamber of the control device in a fluid-communicating manner.

13. The length-adjustable piston rod according to claim 11, wherein the slide valve comprises a single-acting actuating piston which is axially displaceable in a hydraulic working chamber and the slide valve comprises at least six hydraulic connections, wherein three of the at least six hydraulic connections of the control device are constructed as valve inlets and three of the at least six hydraulic connections are constructed as valve outlets, and wherein:
a first valve outlet of the control device is connected or can be connected to a first pressure chamber of the length adjustment device in a fluid-communicating manner by at least one oil supply line;
a second valve outlet of the control device is connected or can be connected to a second pressure chamber of the length adjustment device in a fluid-communicating manner by at least one oil supply line;
a third valve outlet of the control device is connected or can be connected in a fluid-communicating manner to the drainage line;
a first valve inlet of the control device is connected or can be connected in a fluid-communicating manner to the first pressure chamber of the length adjustment device by at least one return line;
a second valve inlet of the control device is connected or can be connected to the second pressure chamber of the length adjustment device in a fluid-communicating manner by at least one return line; and
a third valve inlet of the control device is connected or can be connected to the hydraulic medium supply line in a fluid-communicating manner.

14. The length-adjustable piston rod according to claim 13, wherein the third valve inlet of the control device is connected or can be connected to the hydraulic working chamber of the control device in a fluid-communicating manner, and wherein the third valve inlet is connected or can be connected to the hydraulic medium supply line by the hydraulic switching valve in a fluid-communicating manner by a first actuating line.

15. The length-adjustable piston rod according to claim 10, wherein the slide valve comprises at least one double-acting actuating element that is one of a double-acting hydraulic piston and a double-acting rotary piston and which divides an associated hydraulic working chamber of the control device into a first control pressure chamber and a second control pressure chamber.

16. The length-adjustable piston rod according to claim 15, wherein the hydraulic switching valve comprises at least four hydraulic connections and is constructed as one of a 4/2-way valve and a 4/3-way valve, and wherein:
 a first hydraulic connection of the hydraulic switching valve is connected or can be connected to the hydraulic medium supply line of the piston rod in a fluid-communicating manner;
 a second hydraulic connection of the hydraulic switching valve is connected or can be connected to the drainage line of the piston rod in a fluid-communicating manner;
 a third hydraulic connection of the hydraulic switching valve is connected or can be connected to the first control pressure chamber of the control device in a fluid-communicating manner by a first actuating line; and
 a fourth hydraulic connection of the hydraulic switching valve is connected or can be connected to the second control pressure chamber of the control device in a fluid-communicating manner by a second actuating line.

17. The length-adjustable piston rod according to claim 15, wherein the at least one double-acting actuating element comprises a total of at least four hydraulic connections, and wherein:
 a first hydraulic connection of the control device is connected to the first control pressure chamber in a fluid-communicating manner;
 a second hydraulic connection of the control device is connected to the second control pressure chamber in a fluid-communicating manner;
 a third hydraulic connection of the control device is connected or can be connected to a first pressure chamber of the length adjustment device in a fluid-communicating manner; and
 a fourth hydraulic connection of the control device is connected or can be connected to a second pressure chamber of the length adjustment device in a fluid-communicating manner.

18. The length-adjustable piston rod according to claim 17, wherein the control device comprises an axial slide valve with a first valve and a second valve, each with a valve body arranged in a valve chamber, wherein the valve bodies can each be pressed against an associated valve seat by a restoring force, wherein a first valve chamber of the first valve is flow-connected to a first hydraulic channel and a second valve chamber of the second valve is flow-connected to a second hydraulic channel, and the valve bodies are operatively connected to one another via a connecting device which is displaceable at least between a first position and a second position, and wherein in the first position of the connecting device the first valve body and in the second position of the connecting device the second valve body can be lifted respectively off the associated first or second valve seat by the connecting device against the restoring force and the corresponding first or second valve chamber can be connected to the hydraulic medium supply line in a fluid-communicating manner, and in the respective other position of the connecting device the first valve body rests on the first valve seat or the second valve body rests on the second valve seat and blocks the flow connection to the hydraulic medium supply line.

19. The length-adjustable piston rod according to claim 17, wherein the at least one double-acting actuating element of the slide valve comprises a total of at least six hydraulic connections, and wherein a fifth hydraulic connection of the control device and a sixth hydraulic connection of the control device are each connected to the hydraulic medium supply line in a fluid-communicating manner.

20. The length-adjustable piston rod according to claim 9, wherein the piston rod comprises a hydraulic medium supply line, wherein the length adjustment device comprises a hydraulic cylinder with a first pressure chamber and a second pressure chamber, wherein the first pressure chamber and the second pressure chamber are separated from one another by a hydraulic piston, wherein one of the two piston rod sections is connected to the hydraulic cylinder and the other of the two piston rod sections is connected to the hydraulic piston, and wherein the hydraulic medium supply line and the drainage line of the piston rod can each be connected in a fluid-communicating manner to at least one of the first pressure chamber and to the second pressure chamber.

21. The length-adjustable piston rod according to claim 20, wherein in at least one of a first control state of the control device and in a first switching state of the hydraulic switching valve a return flow of hydraulic medium out of the first pressure chamber of the length adjustment device is blocked and the second pressure chamber of the length adjustment device is drained, and wherein in at least one of a second control state of the control device and in a second switching state of the hydraulic switching valve a return flow out of the second pressure chamber of the length adjustment device is blocked and the first pressure chamber of the length adjustment device is drained.

22. The length-adjustable piston rod according to claim 20, wherein in at least one of a first control state of the control device and in a first switching state of the hydraulic switching valve, the hydraulic medium supply line is connected to the first pressure chamber of the length adjustment device in a fluid-communicating manner, and the second pressure chamber of the length adjustment device is connected to the drainage line, and wherein in at least one of a second control state of the control device and in the first switching state of the hydraulic switching valve the hydraulic medium supply line is connected to the second pressure chamber of the length adjustment device in a fluid-communicating manner, and the first pressure chamber of the length adjustment device is connected to the drainage line.

23. The length-adjustable piston rod according to claim 20, wherein the hydraulic medium supply line is connected or can be connected by a bypass line in a fluid-communicating manner to at least one of the first pressure chamber of the length adjustment device and to the second pressure chamber of the length adjustment device while bypassing the control device.

24. The length-adjustable piston rod according to claim 20, wherein the hydraulic medium supply line is connected or can be connected in a fluid-communicating manner by respective non-return valves to at least one of the first pressure chamber of the length adjustment device and to the second pressure chamber of the length adjustment device.

25. A reciprocating piston internal combustion engine, comprising:

a piston rod with a length that is adjustable;

a length adjustment device operable to adjust an effective length of the piston rod;

a control device that is hydraulically actuatable and which can be switched between at least two control states for controlling the length adjustment; and a hydraulic switching valve that is electromagnetically actuatable for hydraulic actuation of the control device, wherein the hydraulic switching valve can be actuated inductively and is electrically switchable, wherein the piston rod comprises an induction device for inductively actuating the hydraulic switching valve, and wherein the hydraulic switching valve is electrically connected or can be electrically connected to the induction device.

26. A vehicle with a reciprocating piston internal combustion engine, comprising:

a piston rod having an adjustable length;

a length adjustment device operable to adjust an effective length of the piston rod;

a control device that is hydraulically actuatable and which can be switched between at least two control states for controlling the length adjustment; and a hydraulic switching valve that is electromagnetically actuatable for hydraulic actuation of the control device, wherein the hydraulic switching valve can be actuated inductively and is electrically switchable, wherein the piston rod comprises an induction device for inductively actuating the hydraulic switching valve, and wherein the hydraulic switching valve is electrically connected or can be electrically connected to the induction device.

* * * * *